(12) United States Patent
Ramaswamy

(10) Patent No.: US 12,069,115 B2
(45) Date of Patent: Aug. 20, 2024

(54) VIDEO STREAMING DELIVERY

(71) Applicant: Comcast Cable Communications, LLC, Philadelphia, PA (US)

(72) Inventor: Srinath V. Ramaswamy, East Windsor, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 470 days.

(21) Appl. No.: 15/825,871

(22) Filed: Nov. 29, 2017

(65) Prior Publication Data

US 2019/0166170 A1    May 30, 2019

(51) Int. Cl.
| | |
|---|---|
| *H04L 65/61* | (2022.01) |
| *H04L 65/75* | (2022.01) |
| *H04N 21/234* | (2011.01) |
| *H04N 21/2343* | (2011.01) |
| *H04N 21/235* | (2011.01) |
| *H04N 21/2362* | (2011.01) |
| *H04N 21/2365* | (2011.01) |
| *H04N 21/24* | (2011.01) |
| *H04N 21/6373* | (2011.01) |

(Continued)

(52) U.S. Cl.
CPC .............. *H04L 65/61* (2022.05); *H04L 65/75* (2022.05); *H04N 21/23418* (2013.01); *H04N 21/2355* (2013.01); *H04N 21/2358* (2013.01); *H04N 21/6373* (2013.01); *H04N 21/6377* (2013.01); *H04N 21/6547* (2013.01); *H04N 21/23439* (2013.01); *H04N 21/2362* (2013.01); *H04N 21/23655* (2013.01); *H04N 21/2402* (2013.01); *H04N 21/2408* (2013.01)

(58) Field of Classification Search
CPC .............. H04L 65/4069; H04L 65/601; H04N 21/23418; H04N 21/2355; H04N 21/2358; H04N 21/6373; H04N 21/6377; H04N 21/6547; H04N 21/23439; H04N 21/2362; H04N 21/23655; H04N 21/2402; H04N 21/2408
See application file for complete search history.

(56) References Cited

U.S. PATENT DOCUMENTS

| | | | |
|---|---|---|---|
| 8,751,906 B2 * | 6/2014 | Yeo | H03M 13/3715 714/763 |
| 8,898,717 B1 | 11/2014 | Labrozzi et al. | |
| 8,959,244 B2 | 2/2015 | Lin et al. | |

(Continued)

FOREIGN PATENT DOCUMENTS

WO    2013004260 A1    1/2013

OTHER PUBLICATIONS

Pantos, "HTTP Live Streaming", Oct. 5, 2009, 20 pages total.*

(Continued)

*Primary Examiner* — Todd L Barker
(74) *Attorney, Agent, or Firm* — Banner & Witcoff, Ltd.

(57) ABSTRACT

The disclosure relates to a method of determining complexities and/or quality of video segments of a video program and providing data indicating the quality of video segments to user devices. Such data may be included in a manifest file of the video program. Based on the data indicating the complexities and/or quality of video segments, a user device or the system may choose a bitrate version for each video segment that minimizes network bandwidth usage while providing sufficient video quality.

22 Claims, 15 Drawing Sheets

(51) Int. Cl.
*H04N 21/6377* (2011.01)
*H04N 21/6547* (2011.01)

(56) References Cited

U.S. PATENT DOCUMENTS

| | | | | |
|---|---|---|---|---|
| 9,699,464 | B2* | 7/2017 | Shao | H04N 19/184 |
| 9,794,601 | B2* | 10/2017 | Li | H04N 21/23439 |
| 10,163,029 | B2* | 12/2018 | Doshi | G06K 9/38 |
| 10,334,223 | B2* | 6/2019 | Rabii | H04N 13/161 |
| 10,419,787 | B2* | 9/2019 | Li | H04N 21/2662 |
| 10,498,655 | B1* | 12/2019 | Nitzan | H04L 43/0882 |
| 2007/0280294 | A1* | 12/2007 | Hunt | H04N 19/115 |
| | | | | 370/485 |
| 2008/0133767 | A1 | 6/2008 | Birrer et al. | |
| 2011/0082946 | A1 | 4/2011 | Gopalakrishnan | |
| 2012/0087415 | A1* | 4/2012 | Rabii | H04N 19/44 |
| | | | | 375/E7.027 |
| 2012/0144444 | A1 | 6/2012 | Hunt | |
| 2012/0317459 | A1* | 12/2012 | Yeo | H03M 13/05 |
| | | | | 714/763 |
| 2013/0031579 | A1 | 1/2013 | Klappert | |
| 2013/0091297 | A1 | 4/2013 | Minder et al. | |
| 2014/0010282 | A1* | 1/2014 | He | H04N 21/8456 |
| | | | | 375/240.02 |
| 2014/0019635 | A1 | 1/2014 | Reznik et al. | |
| 2014/0143823 | A1* | 5/2014 | Manchester | H04N 21/8456 |
| | | | | 725/116 |
| 2014/0149557 | A1* | 5/2014 | Lohmar | H04L 65/605 |
| | | | | 709/219 |
| 2014/0150019 | A1 | 5/2014 | Ma et al. | |
| 2014/0219230 | A1* | 8/2014 | Schierl | H04W 72/08 |
| | | | | 370/329 |
| 2014/0229604 | A1 | 8/2014 | Pfeffer | |
| 2014/0355603 | A1 | 12/2014 | Li et al. | |
| 2015/0023404 | A1* | 1/2015 | Li | H04N 19/152 |
| | | | | 375/240.02 |
| 2015/0082345 | A1* | 3/2015 | Archer | H04N 21/2668 |
| | | | | 725/34 |
| 2015/0201042 | A1* | 7/2015 | Shah | H04L 65/4084 |
| | | | | 709/219 |
| 2015/0288617 | A1 | 10/2015 | Dasher et al. | |
| 2015/0381686 | A1 | 12/2015 | Hurst | |
| 2016/0014418 | A1* | 1/2016 | Shao | H04N 19/174 |
| | | | | 375/240.02 |
| 2016/0028647 | A1* | 1/2016 | Ramakrishnan | H04L 47/783 |
| | | | | 709/226 |
| 2016/0044080 | A1 | 2/2016 | DuBreuil | |
| 2016/0050246 | A1* | 2/2016 | Liao | H04W 48/16 |
| | | | | 709/219 |
| 2016/0057489 | A1* | 2/2016 | He | H04N 21/26258 |
| | | | | 725/14 |
| 2016/0088054 | A1 | 3/2016 | Hassan et al. | |
| 2016/0112732 | A1* | 4/2016 | Li | H04N 21/2662 |
| | | | | 725/116 |
| 2016/0315991 | A1* | 10/2016 | Oh | H04L 67/02 |
| 2016/0323606 | A1* | 11/2016 | Mao | H04N 21/64707 |
| 2016/0366413 | A1* | 12/2016 | Zhang | H04N 19/177 |
| 2017/0055007 | A1* | 2/2017 | Phillips | H04N 21/8456 |
| 2017/0055012 | A1* | 2/2017 | Phillips | H04N 21/2402 |
| 2017/0171264 | A1* | 6/2017 | Salomons | H04L 65/4069 |
| 2017/0171578 | A1* | 6/2017 | Joong | H04L 65/4084 |
| 2017/0195390 | A1* | 7/2017 | Heinz | H04N 21/4781 |
| 2017/0347152 | A1* | 11/2017 | Yam | H04N 21/44222 |
| 2018/0007375 | A1* | 1/2018 | He | H04N 19/154 |
| 2018/0035140 | A1* | 2/2018 | Li | H04N 21/23439 |
| 2018/0070119 | A1* | 3/2018 | Phillips | G06T 19/006 |
| 2018/0109819 | A1* | 4/2018 | Lu | H04N 21/2387 |
| 2018/0324488 | A1* | 11/2018 | He | H04N 21/4825 |
| 2019/0098316 | A1* | 3/2019 | Vermeir | H04N 19/46 |
| 2019/0158830 | A1* | 5/2019 | Carmel | H04N 19/124 |
| 2020/0213371 | A1* | 7/2020 | Szucs | H04N 21/23439 |

OTHER PUBLICATIONS

Lee et al., "RFC 3986: Uniform Resource Indentifier (URI): Generic Syntax", Jan. 2005, 61 pages total.*

Langroodi et al., "Deocder-Complexity-Aseare Encoding of Motion Compensation for Multiple Hetorogeneous Receiver", ACM Transactions on Multimedia Computing, Communications, and Applications, vol. 11, Feb. 2015.*

Shiang et al., "A Quality-Centric TCP-Friendly Congestion Control for Multimedia Transmission", IEEE Transactions on Multimedia, vol. 14, Issue 3), Jun. 2012, IEEE Publishing.*

Zorilla et al., "SaW: Video Analysis in Social Media with Web-Based Mobile Grid Computing", IEEE Transactions on Mobile Computing, vol. 17, Issue: 6, Jun. 2018.*

Floris et al. The impact of interactivity on the QoE: A preliminary analysis, IEEE International Conference on Communication Workshop, Jun. 2015, IEEE Publishing.*

Feb. 12, 2019—EP Search Report—EP 18208874.0.
Jun. 23, 2020—European Office Action—EP 18208874.0.

* cited by examiner

| Segment ID | Access Location for High Quality version | Access Location for Intermediate Quality version | Access Location for Low Quality version | Complexity Rating | Correlation to quality/bitrate |
|---|---|---|---|---|---|
| 1 | H(1) | M(1) | L(1) | 10 | L |
| 2 | H(2) | M(2) | L(2) | 5 | L |
| 3 | H(3) | M(3) | L(3) | 7.5 | L |
| 4 | H(4) | M(4) | L(4) | 45 | M |
| 5 | H(5) | M(5) | L(5) | 50 | M |
| 6 | H(6) | M(6) | L(6) | 90 | H |
| 7 | H(7) | M(7) | L(7) | 100 | H |
| 8 | H(8) | M(8) | L(8) | 95 | H |
| 9 | H(9) | M(9) | L(9) | 55 | M |
| 10 | H(10) | M(10) | L(10) | 57.5 | M |
| 11 | H(11) | M(11) | L(11) | 52.5 | M |
| 12 | H(12) | M(12) | L(12) | 10 | L |
| 13 | H(13) | M(13) | L(13) | 5 | L |
| 14 | H(14) | M(14) | L(14) | 7.5 | L |
| 15 | H(15) | M(15) | L(15) | 7.5 | L |
| 16 | H(16) | M(16) | L(16) | 5 | L |

Figure 5

| Segment ID | High Service Playlist | Intermediate Service Playlist | Low Service Playlist | Complexity Rating | Correlation to quality/bitrate |
|---|---|---|---|---|---|
| 1 | L(1) | L(1) | L(1) | 10 | L |
| 2 | L(2) | L(2) | L(2) | 5 | L |
| 3 | L(3) | L(3) | L(3) | 7.5 | L |
| 4 | M(4) | M(4) | L(4) | 45 | M |
| 5 | M(5) | M(5) | L(5) | 50 | M |
| 6 | H(6) | M(6) | L(6) | 90 | H |
| 7 | H(7) | M(7) | L(7) | 100 | H |
| 8 | H(8) | M(8) | L(8) | 95 | H |
| 9 | M(9) | M(9) | L(9) | 55 | M |
| 10 | M(10) | M(10) | L(10) | 57.5 | M |
| 11 | M(11) | M(11) | L(11) | 52.5 | M |
| 12 | L(12) | L(12) | L(12) | 10 | L |
| 13 | L(13) | L(13) | L(13) | 5 | L |
| 14 | L(14) | L(14) | L(14) | 7.5 | L |
| 15 | L(15) | L(15) | L(15) | 7.5 | L |
| 16 | L(16) | L(16) | L(16) | 5 | L |

Figure 7

Table A

| highSkippedMacroblockCountFrame | largePartitionBlockSizeFrame | interPFrame | lowMotionFrame | HighDetail_ActivityFrame |
|---|---|---|---|---|
| false | False | false | false | true |
| true | N/A | N/A | N/A | false |
| false | true | false | false | true |
| false | true | true | false | false |
| false | true | true | true | false |
| false | false | true | false | true |
| false | false | true | true | false |
| false | false | false | true | false |

Figure 10A

Table B

| highSkippedMacroblockCountFrame | largePartitionBlockSizeFrame | interBIframe | lowMotionFrame | HighDetail_ActivityFrame |
|---|---|---|---|---|
| false | false | false | false | true |
| true | N/A | N/A | N/A | false |
| False | true | false | false | true |
| False | true | true | false | false |
| False | true | true | true | false |
| False | false | true | false | true |
| False | false | true | true | false |
| False | false | false | True | false |

Figure 10B

VIDEO STREAMING DELIVERY

BACKGROUND

In delivering Internet Protocol (IP) video streaming, video service providers often provide multiple versions of a particular piece of content (e.g., different quality/bitrate versions of a movie, where some versions require more bandwidth than others), but even in such systems there can be inefficient use of the bandwidth. For example, some users may request the highest quality version, even if there is no (or minimal) perceivable difference between that version and a slightly lower quality version. There remains an ever-present need to efficiently manage the available transmission bandwidth.

SUMMARY

Features described herein generally relate to analyzing encoded content to determine complexity (e.g., data indicating a detail/activity level) of each segment included in the encoded content, and the complexity may be used to select one of various quality/bitrate versions of the segment to download. Features described herein also relate to analyzing encoded content to determine whether the encoded content has been encoded beyond a requirement for presentation, and also determine that a lower quality version of the segment is available and has been deemed acceptable for presentation (e.g., based on user preferences), such that it has been encoded using a higher quality/bitrate than is actually needed. For example, a movie may be encoded in a high resolution because the movie has many scenes with lots of small details, but some scenes in the movie might not require such a high resolution because the scenes do not have as many small details as other scenes. As described herein, a content processing unit may evaluate the complexity for each segment of a piece of content based on a detail/activity level of each segment, and may dynamically determine that a lower quality version will suffice, even if a higher quality version was requested. So, for example, a user might request to view the high resolution version of that movie, but for some scenes, the system may deliver a lower quality version of the movie's video instead.

In some examples, the content processing unit may determine the complexity for each video segment included in a video program based on a detail/activity level of each segment, and may include the complexity data in a manifest file of the video program. The content processing unit may communicate the manifest file to user devices.

In some examples, for each video segment included in the video program, the content processing unit may determine which quality/bitrate version(s) has been encoded beyond a requirement for presentation, and may also determine that a lower quality version of the segment is available and has been deemed acceptable for presentation (e.g., based on user preferences). The content processing unit may also determine which quality/bitrate version(s) has been encoded within the requirement for presentation. The above determination may include analyzing a quality of each frame of each video segment. Analysis of the quality of the frame may be based on a frame type of the frame, and may include tables indicating results of different types of frame analysis (e.g., analysis of block size, amount of motion, etc.) and a degree of frame quality that is deemed appropriate for the frame. The content processing unit may generate a manifest file of the video program and indicate that lower quality versions of certain segments are available, and/or indicate a complexity for the segment, so that another device can determine whether to use the lower quality version instead. The content processing unit may communicate the manifest file to user devices.

In some examples, the user devices or the system may make a downloading decision for the video program at least partially based on the manifest file. For example, a user device that is presenting a high-quality version of a movie may decide that given its current state of network connection, the complexity of an upcoming video segment in the movie, and user preferences, a lower-quality version of the upcoming video segment will suffice, and may download that lower-quality version instead of a high-quality version.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 5 shows an example manifest file indicating complexity of each segment of the video of FIG. 4 according to one or more illustrative aspects of the disclosure.

FIG. 7 shows an example manifest file of the video of FIG. 4 based on quality of the video according to one or more illustrative aspects of the disclosure.

FIG. 10A is an example true table used at step 928 of FIG. 9B according to one or more illustrative aspects of the disclosure.

FIG. 10B is an example true table used at step 938 of FIG. 9C according to one or more illustrative aspects of the disclosure.

DETAILED DESCRIPTION

In the following description of various illustrative features, reference is made to the accompanying drawings, which form a part hereof, and in which is shown, by way of illustration, various features in which aspects of the disclosure may be practiced. It is to be understood that other features may be utilized, and structural and functional modifications may be made, without departing from the scope of the present disclosure.

Figure 1:
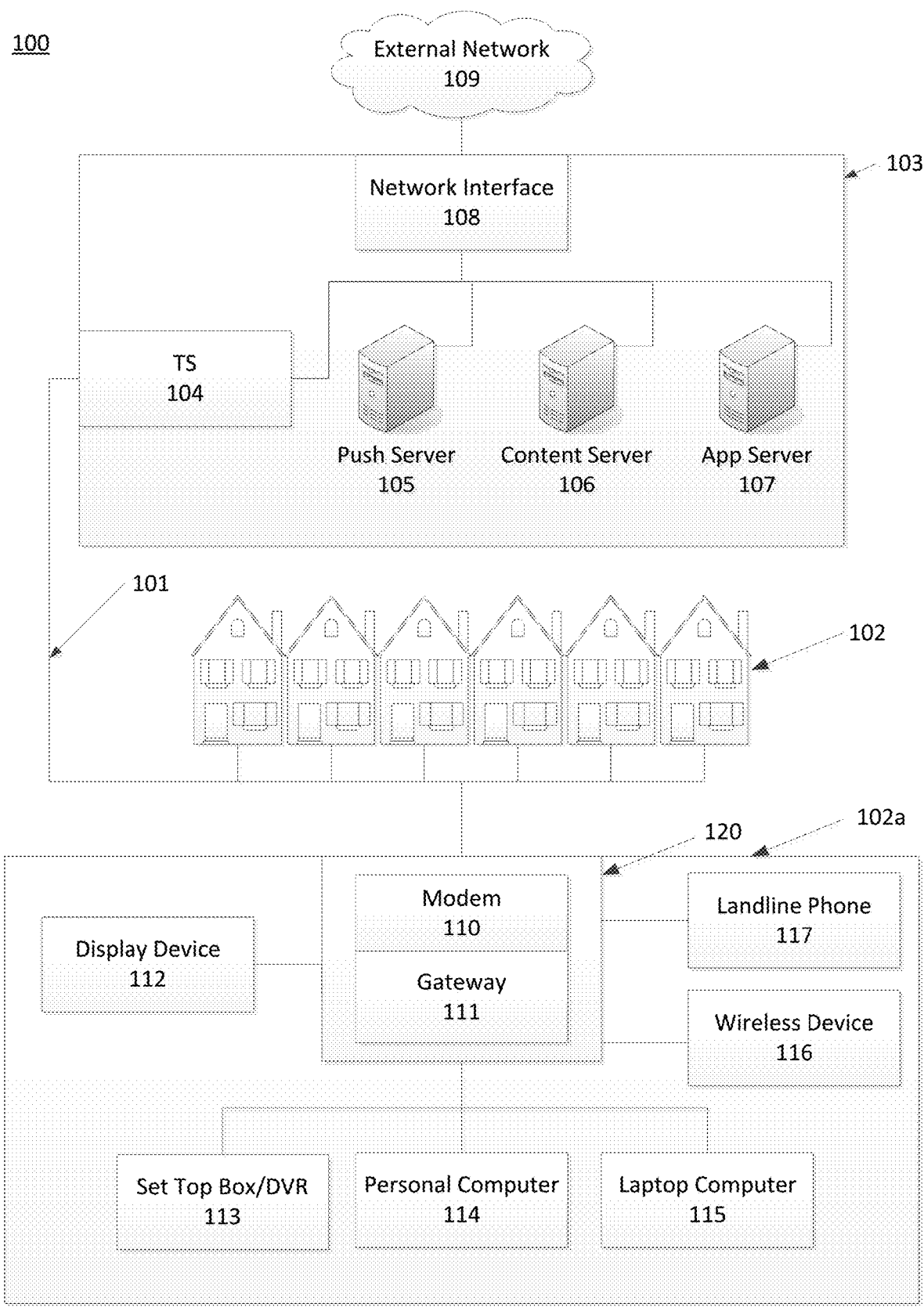
FIG. 1 illustrates an example communication network on which many of the various features described herein may be implemented.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream signals onto the links 101, and each premises 102 may have a receiver to receive and process those signals.

There may be one link 101 originating from the local office 103, and it may be split a number of times to distribute the signals to various premises 102 in the vicinity (which may be many miles) of the local office 103. The links 101 may include components not illustrated, such as splitters, filters, amplifiers, etc. to clear convey of the signals. Some portions of the links 101 may also be implemented with fiber-optic cable, while other portions may be implemented with coaxial cable, other lines, or wireless communication paths.

The local office 103 may include an interface, such as a termination system (TS) 104. More specifically, the termination system 104 may be a cable modem termination system (CMTS), which may be a computing device configured to manage communications between devices on the network of links 101 and backend devices such as servers 105-107 (to be discussed further below). The termination system 104 may be as specified in a standard, such as the Data Over Cable Service Interface Specification (DOC SIS) standard, published by Cable Television Laboratories, Inc. (a.k.a. CableLabs), or it may be a similar or modified device instead. The termination system 104 may be configured to place data on one or more downstream frequencies to be received by modems at the various premises 102, and to receive upstream signals from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, live video programs, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

Video content generally refers to information displayed (or displayable) to a user in the form of one or more images. Video content may have associated audio content, e.g., information presented (or presentable) to a user in audio form. Video content may have associated closed captioning content. Video content can be communicated or stored in the form of data. Video content data providing a digital representation of a particular video content can be created using any of various encoding techniques. Such encoding techniques include, but are not limited to, compression according to a Motion Picture Experts Group (MPEG) standard (e.g., MPEG-2), compression according to the ITU-T H.264 (ISO/IEC MPEG-4) advanced video coding (AVC) standard, etc.

In the implementation of adaptive bitrate streaming (ABS), a video may be encoded using either MPEG-2 or AVC. The video may be divided into multiple video segments, e.g., video data chunks each having, for example, a few seconds duration. Each segment may be encoded at different bitrates/qualities such that different quality levels of each fragment may be available for user devices (which will be discussed below) to download. The system may send a manifest file of the video to the user devices, and the manifest file may list segment identifications (IDs), an attribute/indication of a respective quality version of each segment for a playback of the video corresponding to a respective quality service, and other parameters of each video segment of the video. In some examples, the attribute/indication of the respective quality version may indicate an access location of the respective quality version. The manifest file may be a video stream description file that describes any characteristic/property of the video stream.

One example uses MPEG-2 (Moving Pictures Expert Group) encoding, which uses motion vector-based compression to efficiently represent the stream of image frames. Using this compression, each frame is categorized as either an independent frame or a dependent frame. Independent frames are represented in the stream by data that is sufficient to generate the frame's complete image without knowledge about neighboring frames in the stream, similar to how a still image picture may be represented. The first frame after a scene change is typically represented using an independent frame.

Dependent frames, as their name implies, are represented by data that is dependent on another frame in the stream, such as a corresponding independent frame, to generate the complete image of the dependent frame. The data representing a dependent frame may simply indicate changes with respect to a prior frame. For example, the data for a dependent frame may simply indicate that a first portion of the image remains unchanged from the prior frame, and that a second portion moves some distance (e.g., 3 pixels) to the right. In this manner, the data representing the dependent frame can omit the full details for the first portion of the dependent frame's image, thereby reducing the amount of data that is needed to be transmitted.

In the MPEG-2 standard, which is one example audiovisual standard usable herein, independent frames are referred to as Intra-coded picture frames (I-frames), while dependent frames are referred to as either Predicted picture frames (P-frames), or a Bi-directional predicted picture frames (B-frames). A P-frame is dependent on a prior frame in the stream, while a B-frame is dependent on both a prior and a subsequent frame in the stream.

Video content data may be included in a single data stream that also includes associated audio content, or associated audio content may be carried in a stream separated from an audio stream. A video content data stream can be transmitted via the communication network 100, by modulating some type of signal (e.g., an optical signal, an RF carrier signal, an electrical signal carried over a twisted pair) that is communicated over some type of medium (e.g., optical fiber, coaxial cable, twisted pair conductor, free space, etc.) using one or more of various types of communication protocols (e.g., internet protocol). The received signal may then be processed by the premise 102a to extract the video content data stream and be displayed by the display device 112 of the premise 102a. In addition to demodulating the received signal, such extraction may include demultiplexing by isolating a signal carried on a particular optical wavelength or RF frequency from signals on other wavelengths or frequencies, by isolating certain data segments from other data segments, and/or by other types of demultiplexing techniques. Once the data stream has been extracted, data from that stream can then be decoded and used to generate appropriate electrical signals. Those electrical signals can then be output to a display device, for example, by the aforementioned display device 112, so as to cause the display device to present the video content on a display screen. Video content data can also be stored in some type of storage device (e.g., a magnetic disk drive) and then later retrieved for decoding and presentation in a similar manner.

As discussed previously, the video will be delivered to user devices in form of segments in a predetermined order. The user devices may be implemented with any of numerous types of devices, including but not limited to, display devices 112 (e.g., VR (virtual reality) headset, television, high definition television (HDTV), smart television, host viewing device, monitor, game playing device, etc.), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones (e.g., smart phones), mobile televisions, personal digital assistants (PDA), etc.), landline phones 117 (e.g. Voice over Internet Protocol—VoIP phones), and any other desired devices. It should be understood that the user device may be any type of electronic device that may display the video content. In reference to FIG. 1, the local office 103 may further include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX, and COMET. For example, an application server may be responsible for collecting television program listings information and generating a data download for electronic program guide listings. In another example, the application server may be responsible for fragmenting a video stream into multiple video segments and providing multiple bitrate versions for each video fragment. In another example, the application server may determine quality of the video segments. In another example, the application server may communicate data indicating the quality of segments with user devices. In another example, the application server may include the data indicating the quality of segments with user devices in a manifest file of the video program. In another example, all or a portion of any one of methods of the present disclosure may be implemented on any of the push notification server 105, the content server 106, the application server 107, and other various servers or components, or on any combination of these servers. Although shown separately, one of ordinary skill in the art will appreciate that the push notification server 105, the content server 106, and the application server 107 may be combined. Further, here the push notification server 105, the content server 106, and the application server 107 are shown generally, and it will be understood that they may each contain memory storing computer executable instructions to cause a processor thereof to perform steps described herein and/or a storage for storing data. An exemplary premise 102a, such as a home, may include an interface 120. The interface 120 can include any communication circuitry needed to allow a device to communicate on one or more links 101 with other devices in the network 100. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway 111. The modem 110 may be connected to, or be a part of, the gateway 111. The gateway 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting user entities/devices in the premises 102a, such as display devices 112, additional STBs or DVRs 113, personal computers 114, laptop computers 115, wireless devices 116, landline phones 117, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
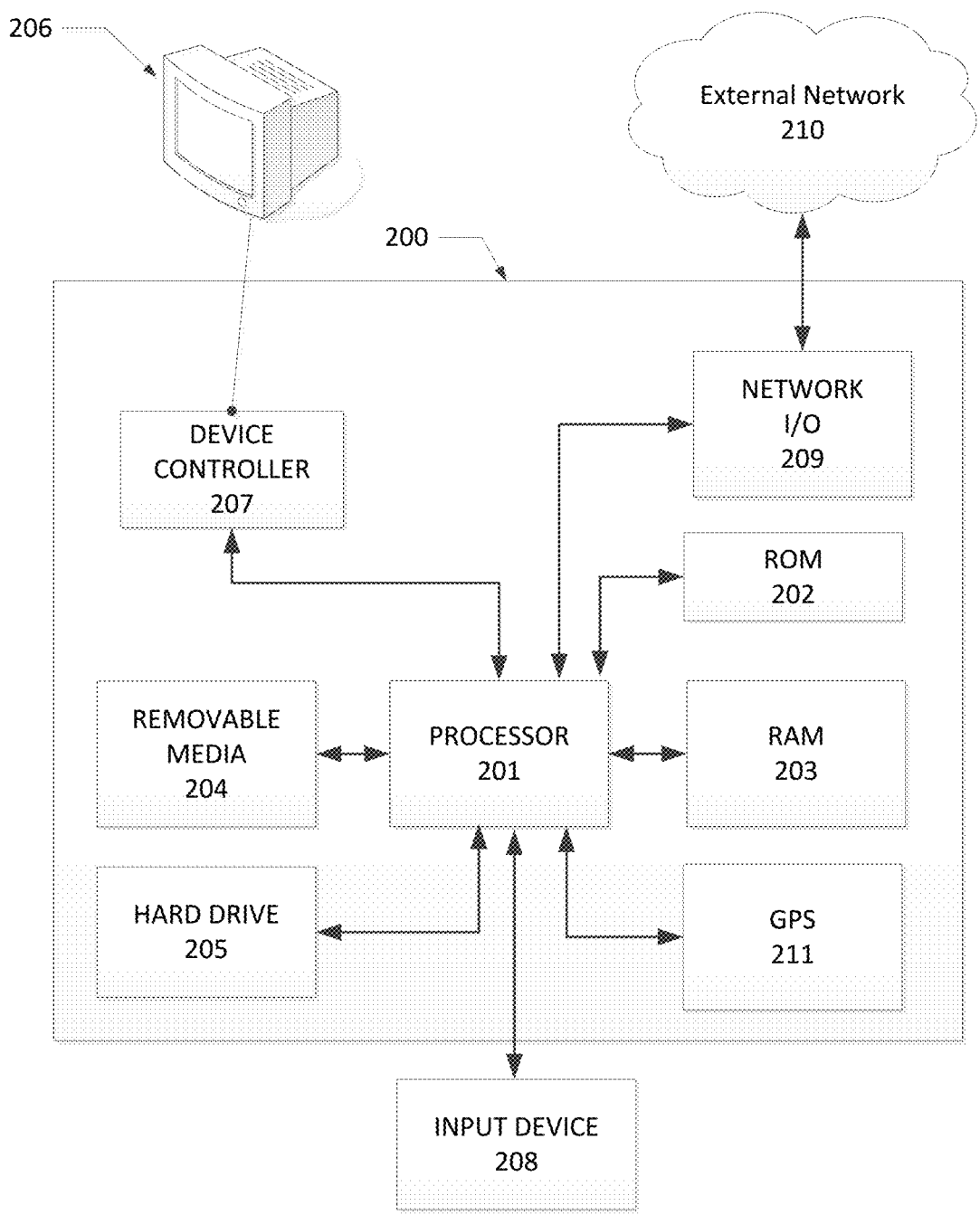
FIG. 2 illustrates an example computing device that can be used to implement any of the methods described herein.

FIG. 2 illustrates an exemplary computing device that can be used to implement any of the methods described herein. It should be understood that servers, user devices, and other related components of the communication network mentioned in this disclosure may be computing devices implemented with all or a portion of the hardware elements of FIG. 2.

The computing device 200 may include one or more processors 201, which may execute instructions of a computer program to perform any of the features described herein. The instructions may be stored in any type of non-transitory computer-readable medium or memory, to configure the operation of the processor 201. For example, instructions may be stored in a read-only memory (ROM) 202, a random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include or be coupled to one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The example of FIG. 2 is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more non-transitory computer readable media such as a hard disk, optical disk, removable storage media, solid state memory, ROM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Some components illustrated in FIG. 2 may be omitted in the computing device 200 according to design particulars. For example, when the computing device 200 is configured as a server, the GPS 211 may be omitted.

As mentioned previously, when making a downloading determination for the video segments, the user devices typically attempt to acquire the higher bitrate video segments available to download, even when the gain in users viewing experience from acquiring the higher bitrate video segments is minimal. For example, when a video segment includes only a blue sky or a scene having a talking head, such a video segment does not include many details or activities. For such a video segment, acquiring a lower bitrate version for display, compared to acquiring higher bitrate versions for display, would not disadvantageously impact the users viewing experience. Thus, when making the downloading determination for such a video segment, the user devices can choose to acquire a lower bitrate for transmission even when higher bitrates are available, because such a determination will save the network bandwidth and increase the downloading speed without disadvantageously impacting the users viewing experience. To realize this, the system may determine complexity or quality of video segments of a video program and communicate data indicating the complexity or quality of video segments to user devices. Based on the data indicating the quality of video segments, the user devices may choose a bitrate version, among multiple bitrate versions, for each video segment that minimizes network bandwidth usage while providing sufficient video quality. Each of the bitrate versions may include data of the segment encoded at a corresponding encoding bitrate, and the corresponding encoding bitrate of each of the bitrate versions may be different from each other. In one implementation, the system may transmit the video streams via MPEG-DASH (Moving Picture Experts Group—Dynamic Adaptive Streaming over HTTP). In MPEG-DASH, the multiple bitrate versions may be represented as multiple Representations.

These features will be further described with reference to FIGS. 3 through 11, described below.

Figure 3:
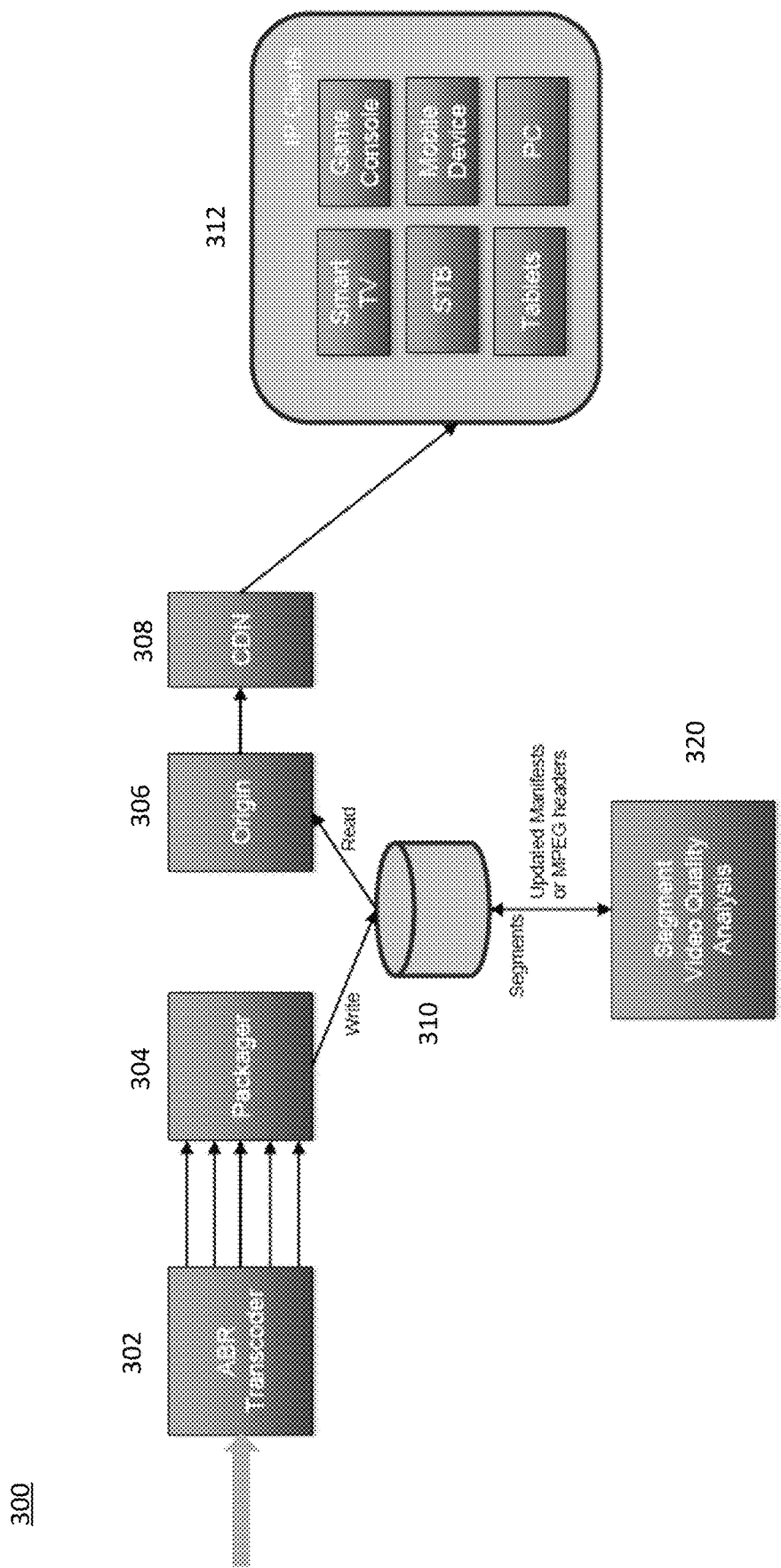
FIG. 3 shows an example system that may determine complexity of each segment of a video program and/or perform quality analysis of the video program according to one or more illustrative aspects of the disclosure.

FIG. 3 shows an example system that may determine complexity of each segment of a video program and/or perform quality analysis of the video program according to one or more illustrative aspects of the disclosure. The system 300 may implement the adaptive bitrate streaming (ABS) wherein a video file may be encoded using MPEG-2. In the system 300, the ABR transcoder 302 may receive the video file by wired or wireless means, for example by antennas or cables. The ABR transcoder 302 may transcode the received video file into multiple video streams respectively encoded in different bitrates.

The packager 304 may receive the multiple video streams output from the ABR transcoder 302. The packager 304 may package the multiple video streams according to the MPEG-DASH specification. The packager 304 may divide each of the multiple video streams into a group of video segments of equal play time. In such a way, the packager 304 may package the encoded video file into a group of video segments each having multiple quality/bitrate versions (e.g., versions encoded at 1080p and 720p resolutions, or versions encoded at 8 Mbps and 5 Mbps bitrates). The packager 304 may create a manifest file providing information of the encoded video file.

In some examples, the manifest file may include data indicating access locations for each quality/bitrate version of each segment of the video file. In some examples, the manifest file may further include data indicating complexity for each segment (e.g., the example manifest file as shown in FIG. 5). The complexity may be data indicating a detail/ activity level of a segment and may be determined based on the detail/activity level of the segment. When the segment includes a scene that has a lot of small details and/or activities (e.g., fast motion), the complexity may be set higher and the higher complexity means that this segment needs to be encoded at a higher bitrate for a satisfactory video quality. When the segment includes a scene that does not have many details and/or activities, the complexity may be set lower and the lower complexity means that this segment can be encoded at a lower bitrate for a satisfactory video quality.

The manifest file and the encoded video file may be stored in a database 310.

The system 300 may further include a content processing unit, e.g., a segment video quality analysis unit 320, that may analyze quality of the video file and update the manifest file (e.g., the example manifest file as shown in FIG. 7 that indicates a pre-formulated playlist for playback of a video file according to a service level associated with the user device requesting the video file) based on the quality of video file. Since the segment video quality analysis unit 320 may analyze the quality of video segments after the transcoding and packaging of the video file, the analysis of quality of video segments does not slow down the transcoding and packaging of the video file and thus does not negatively impact the transcoding workflow.

The manifest file may include any other information related to the video file, for example, start/end time of a segment of a video file.

Details of complexity/quality analysis will be described in FIGS. 4 through 10B.

The origin server 306 may retrieve the video file from the database 310, may send the video file to a content delivery network (CDN) 308, and may eventually deliver the video file to the user devices 312. In some examples, user devices 312 may be Internet Protocol (IP) devices.

In some cases, the user device may determine which quality/bitrate version of each segment should be downloaded for display based on one or more of the complexity of the segment, the configuration of the user device (e.g., display resolution of the user device and/or a service level associated with the user device), or network parameters (e.g., the current network condition). In some cases, the system may use the updated manifest file, e.g., a manifest file indicating a pre-formulated playlist according to a service level, to make the downloading determination. Details of making the downloading determination will be described in FIG. 11.

The complexity of a segment may be determined by one or more of the ABR transcoder 302, the package 304, or the segment video quality analysis unit 320. Although shown separately, one of ordinary skill in the art will appreciate that any of the ABR transcoder 302, the packager 304, the database 310, the database 310, and the segment video quality analysis 320 may be combined.

Figure 4:
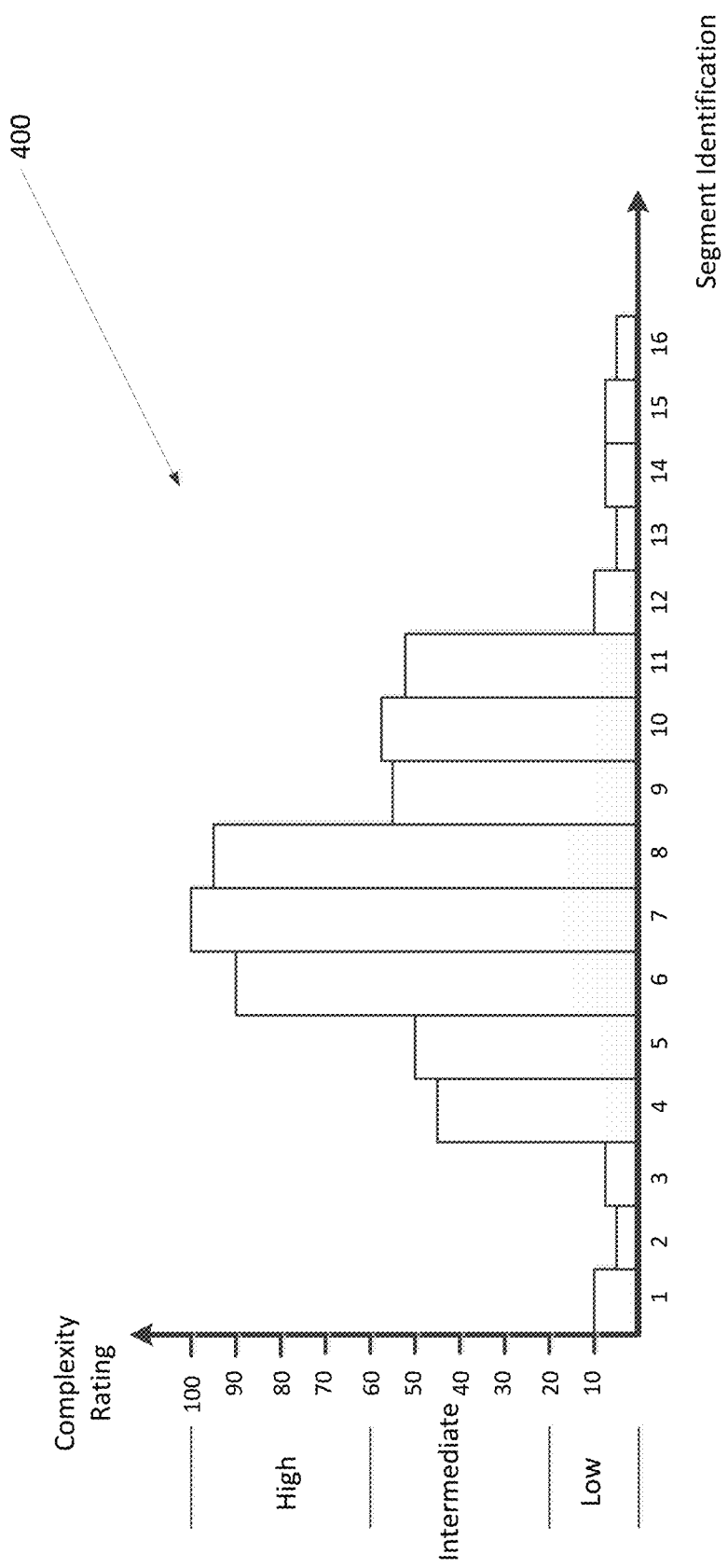
FIG. 4 shows an example video having a plurality of video segments.

FIG. 4 shows an example video having a plurality of video segments.

As shown in FIG. 4, the video 400 includes 16 video segments (e.g., #1-#16 segments), and each segment may include a plurality of video frames. Each segment has a respective segment identification (e.g., 1-16), and the video service providers provide a plurality of quality/bitrate versions (e.g., high, intermediate, and low) for each segment. In this example, the video shows a firework. #1-#3 segments show a clear dark sky with stars before firework starts, and these segments include little details and activities. #4 and #5 segments show that the firework starts, and these segments include more details and activities than #1-#3 segments. #6-#8 segments show the peak of the firework, and these segments include a great amount of details and activities. #9-#11 segments show that the firework is finishing, and these segments include less details and activities than #6-#8 segments. #12-#16 segments again show the dark sky with stars after the firework ends, and similarly to #1-#3 segments, these segments include little details and activities. The system may determine a detail/activity level for each segment and obtain a respective complexity, e.g., a respective normalized complexity rating, for each segment based on the detail/activity level. The higher detail/activity level is, the higher complexity rating is. For example, the complexity rating may be a numeric value, e.g., ranging from 1 to 100, where 1 indicates the lowest detail/activity level of the video and 100 indicates the highest detail/activity level of the video. The system may correlate the high, intermediate, and low bitrate versions to respective ranges of the complexity rating. For example, when a segment having a complexity rating ranging from 1-20, the low quality/bitrate version of the segment is recommended to be downloaded for playback; when a segment having a complexity rating ranging from 20-60, the intermediate quality/bitrate version of the segment is recommended to be downloaded for playback; and when a segment having a complexity rating ranging from 60-100, the high quality/bitrate version of the segment is recommended to be downloaded for playback.

The number of the video segments is not limited to 16, and may be any number. Also, the quality levels are not limited to high, intermediate, and low, and may include any quality levels. Also, the value of complexity rating is not limited to 1-100, and may be any number. Also, the correlation between the quality bitrate version and complexity rating may vary according a type of video. For example, for a video including sport content, the system may set a wider range for the high quality/bitrate version, e.g., when a segment having a complexity rating ranging from 40-100, the high quality/bitrate version of the segment is recommended to be downloaded for playback; and for a video including a scene having a single character playing symphonic orchestra music, the system may set a narrower range for the high quality/bitrate version, e.g., when a segment having a complexity rating ranging from 80-100, the high quality/bitrate version of the segment is recommended to be downloaded for playback.

As discussed previously, the complexity of each segment of the video file may be indicated in the manifest file of the video. FIG. 5 shows an example manifest file indicating complexity of each segment of the video of FIG. 4 according to one or more illustrative aspects of the disclosure.

As shown in FIG. 5, the system may create a manifest file and send the manifest file to the user devices. The manifest file may include segment IDs (e.g., 1-16). See the first column of FIG. 5. The manifest file may include pointers that indicate access locations (e.g., uniform resource locators, Internet addresses, file addresses, etc.) for the plurality of quality/bitrate versions (e.g., high, intermediate, and low) for each segment. See the second, third, and fourth columns of FIG. 5.

To optimize bandwidth allocation, the system may add complexity of each segment into the manifest file and communicate the complexity data to the user device. So, using this example, the system might provide a high quality version of a movie (e.g., providing a high quality service to the user), but for certain segments (e.g., segments 1-5 and 9-16), the user device might actually obtain a lower-quality version instead.

As shown in FIG. 5, the manifest file may further include data indicating the complexity rating for each segment. See the fifth column in FIG. 5. The manifest file may further include data indicating correlation between the complexity rating of the segment and the quality/bitrate version. See the sixth column in FIG. 5. For example, for #1-#3 and #12-#16 segments, the complexity ratings of these segments correlate to low quality/bitrate versions. When a user device that is associated with a high or intermediate quality service (e.g., paying more for better video services compared to a low quality service) makes a downloading decision and the user of the user device has agreed to let the system deliver lower quality versions as needed to optimize bandwidth usage, the user device may determine to download low quality/bitrate versions of these segments because these segments encoded at the low quality/bitrate still provide satisfactory quality presentation to the user without an unacceptable loss in quality. Similarly, for #4-#5 and #9-#11 segments, the user device (associated with the high quality service) may determine to download intermediate quality/bitrate versions of these segments because these segments encoded at the intermediate quality still provide satisfactory quality presentation to the user device without an unacceptable loss in quality.

Figure 6:
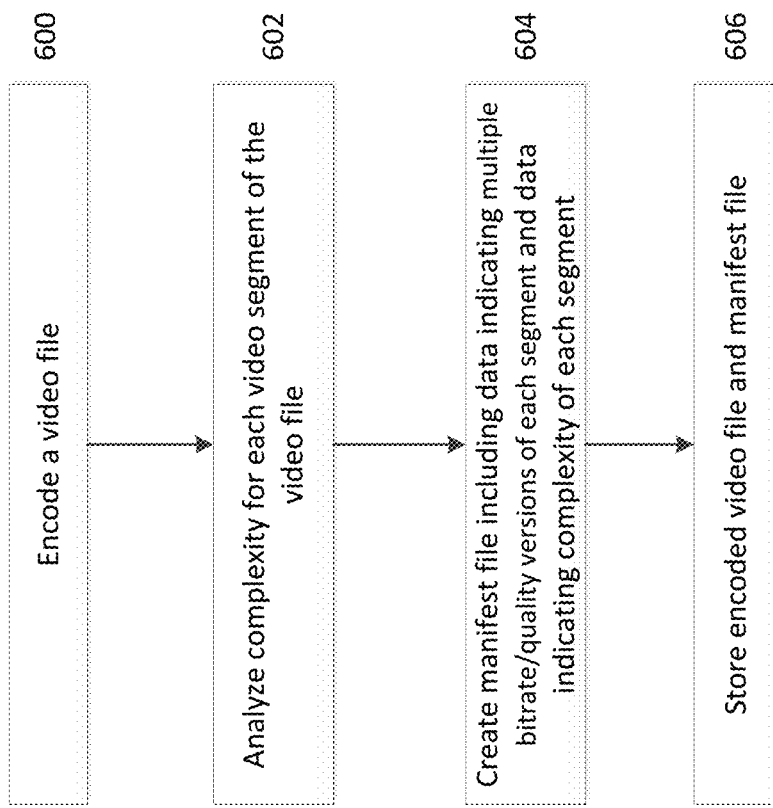
FIG. 6 shows an example flow diagram for determining complexity of each segment of a video file according to one or more illustrative aspects of the disclosure.

FIG. 6 shows an example flow diagram for determining complexity of each segment of a video file according to one or more illustrative aspects of the disclosure. At step 600, the system may transcode a video file into multiple video streams respectively encoded at different bitrates and may package the encoded video file into a group of video segments each having multiple quality/bitrate versions.

At step 602, the system may access each segment and analyze complexity for each segment based on a detail/activity level of the segment. There are a variety of ways to assess the complexity of a segment, and they generally involve the type of encoding used and the resulting effect the encoding has on the resulting segment file (and on the resources needed to store, transmit, and process the file), and quantifying how well each segment benefits from different types of encoding.

One way involves analyzing motion. Some video encoding techniques (e.g., MPEG) involve differential encoding, in which video frames are encoded based on relative changes between successive frames. Video segments having lots of moving objects in the frames benefit the most from having a higher quality version, since there are many moving objects and any loss of detail may be more noticeable.

However, video segments having fewer moving objects in the frame benefit less from having a higher quality version, because there are fewer moving objects and sacrifices in quality may be less noticeable. Accordingly, a video segment having lots of motion may be given a higher complexity rating than a video segment having less motion. The specific numeric value of this complexity rating may be arbitrary, as the value may simply be a measure of the relative complexity of the segment (and indicating the relative benefit from, or need for, a higher quality encoding).

Another way involves block sizes, or sizes of visual objects/colors in the frames. Some video encoding techniques (e.g., MPEG again) may encode video by grouping contiguous pixels having the same color. A video scene having many small objects (e.g., a video showing a crowd of faces in an audience) will benefit from a higher quality version, since there is fine detail in the frames. Conversely, a video scene having fewer objects (e.g., a news program in which the background has large monotone portions) does not need a high quality version, since the loss of detail in using a lower quality version will be less noticeable to the viewer.

At step 604, the system may create a manifest file (e.g., a manifest file as shown in FIG. 5) providing data indicating multiple quality/bitrate versions of each segment and data indicating complexity rate of each segment. At step 606, the system may store the encoded video file and the manifest file in a database. The manifest file may be retrieved to determine which quality/bitrate version of a video segment should be downloaded.

In some cases, when making the downloading determination for a video segment for which acquiring a lower bitrate version for display, compared to acquiring higher bitrate versions for display, would not disadvantageously impact the users viewing experience, the user devices can choose to acquire a lower bitrate for transmission even when higher bitrates are available, because such a determination will save the network bandwidth and increase the downloading speed without disadvantageously impacting the users viewing experience. To realize this, the system may determine quality level (e.g., detail/activity level) of video segments of a video program and communicate data indicating the quality of video segments to user devices by, for example, updating the manifest file to include a pre-formulated playlist for playback according to a service level associated with the user device.

FIG. 7 shows an example manifest file of the video of FIG. 4 based on quality of the video according to one or more illustrative aspects of the disclosure. The manifest file may include a pre-formulated playlist for playback of the video 400 of FIG. 4 according to a service level associated with a user device. In this example, the high quality service user may have agreed to let the system deliver lower quality versions as needed to optimize bandwidth usage by using such a pre-formulated playlist for playback of the video. As previously discussed, the system may analyze detail/activity level of each segment, and update the manifest file based on the detail/activity level of each segment. The system may determine that compared to the higher quality versions, the low quality versions of #1-#3 and #12-#16 segments provide satisfactory quality presentation without an unacceptable loss in quality as these segments have low detail/activity levels; and that compared to the higher quality versions, the intermediate quality versions of #4, #5, #9-#11 segments provide satisfactory quality presentation without an unacceptable loss in quality as these segments have intermediate detail/activity levels. Based on such a determination and upon an agreement with user devices, when a user device associated with a high quality service requests for playback of the video 400 of FIG. 4, the system may send the user device the low quality versions of #1-#3 and #12-#16 segments, the intermediate quality versions of #4, #5, #9-#11 segments, and high quality versions of #6-#8 segments, so that #1-#5 and #9-#16 segments may be encoded at a lower bitrate and such a lower quality is acceptable for presenting a predetermined video quality (based on the pre-formulated playlist as shown in the second column of FIG. 7). Similarly, upon an agreement with user devices, when a user device associated with an intermediate quality service requests for playback of the video 400 of FIG. 4, the system sends the user device the low quality versions of #1-#3 and #12-#16 segments, the intermediate quality versions of #4-#11 segments, so that #1-#3 and #12-#16 segments may be encoded at a lower bitrate and such a lower quality is acceptable for presenting a predetermined video quality (based on the pre-formulated playlist as shown in the third column of FIG. 7). When a user device associated with a low quality service requests for playback of the video 400 of FIG. 4, the system sends the user device all segments in the low quality versions, as the low quality versions are the lowest quality version available for downloading (as shown in the fourth column of FIG. 7). The manifest file may also include complexity rating (as shown in the fifth column of FIG. 7) for each segment and correlation (as shown in the sixth column of FIG. 7) between the high, intermediate, and low bitrate versions and different complexity ratings of segments. Complexity rate and bitrate/complexity correlation of FIG. 7 are similar to the complexity rate and the bitrate/complexity correlation of FIG. 5 discussed above, and discussion on complexity rate and bitrate/complexity correlation of FIG. 7 will be omitted. In some examples, the manifest file may omit complexity rate and bitrate/complexity correlation.

In some examples, even not shown in FIG. 7, the manifest file of FIG. 7 may further include data of second to fourth columns of FIG. 5.

Information included in the manifest file is not limited to what are shown on FIGS. 5 and 7. The manifest file may further include any other information related to the video, for example, start/end time of a video segment.

In some cases, in the implementation of the adaptive bitrate streaming (ABS) where a video may be encoded using MPEG-2, the MPEG-2 Transport packet headers may show data included in the manifest files of FIGS. 5 and 7, e.g., data indicating complexity for video segments, data indicating correlation between different bitrate versions and different complexity ratings, data indicating attributes/indications of the video segments respectively encoded in different bitrates, and data indicating pre-formulated playlists.

As discussed above, the system may analyze encoded content to determine whether the encoded content has been encoded beyond a requirement for presentation and also determine that a lower quality version of the segment has deemed acceptable for presentation (e.g., based on user preferences) such that it has been encoded using a higher quality/bitrate than is actually needed. Example analysis of encoded content will be further described with reference to FIGS. 8A through 10B, described below.

Figure 8A:
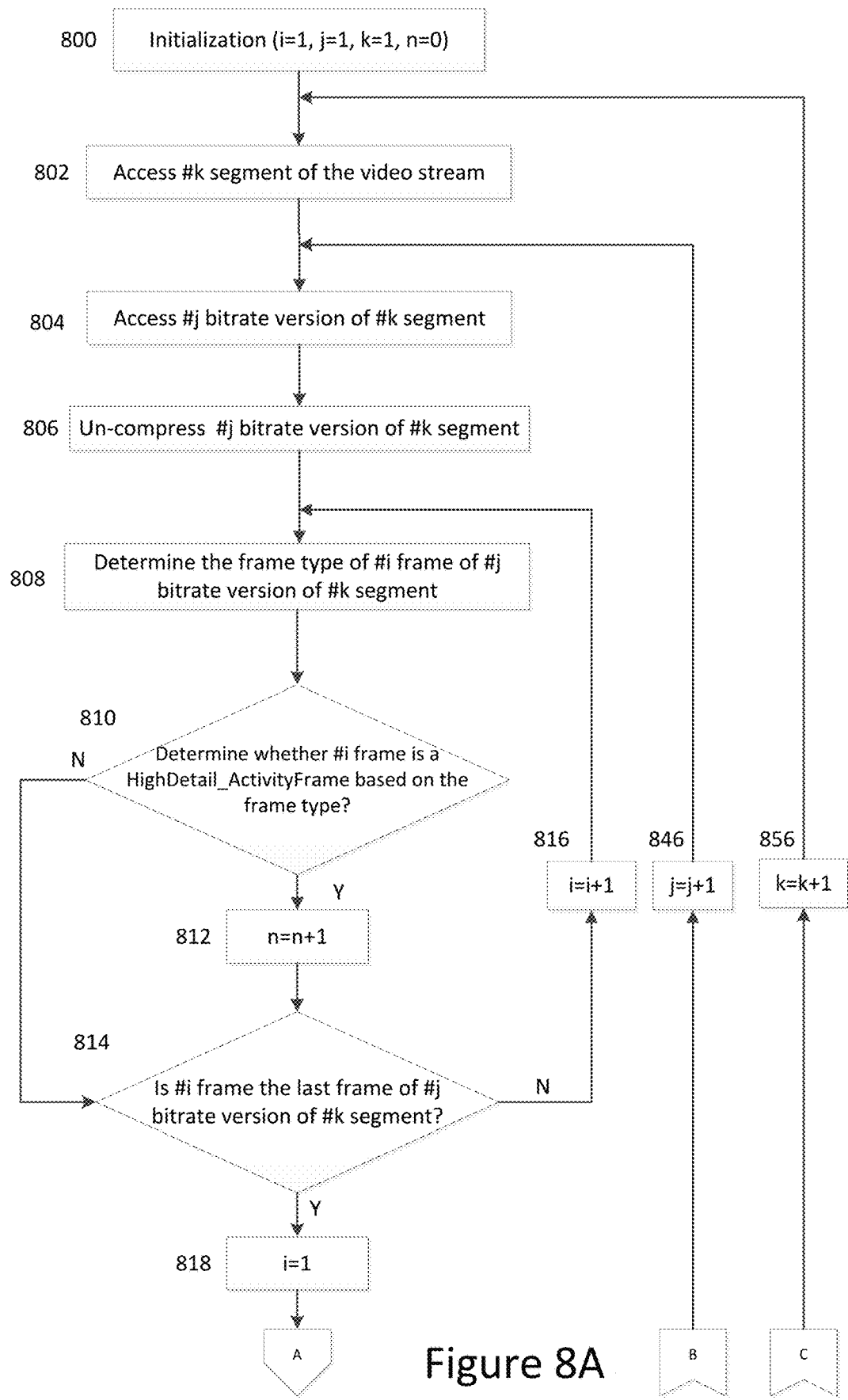
FIGS. 8A and 8B constitute an example flow diagram of determining quality of a video stream according to one or more illustrative aspects of the disclosure.
Figure 8B:
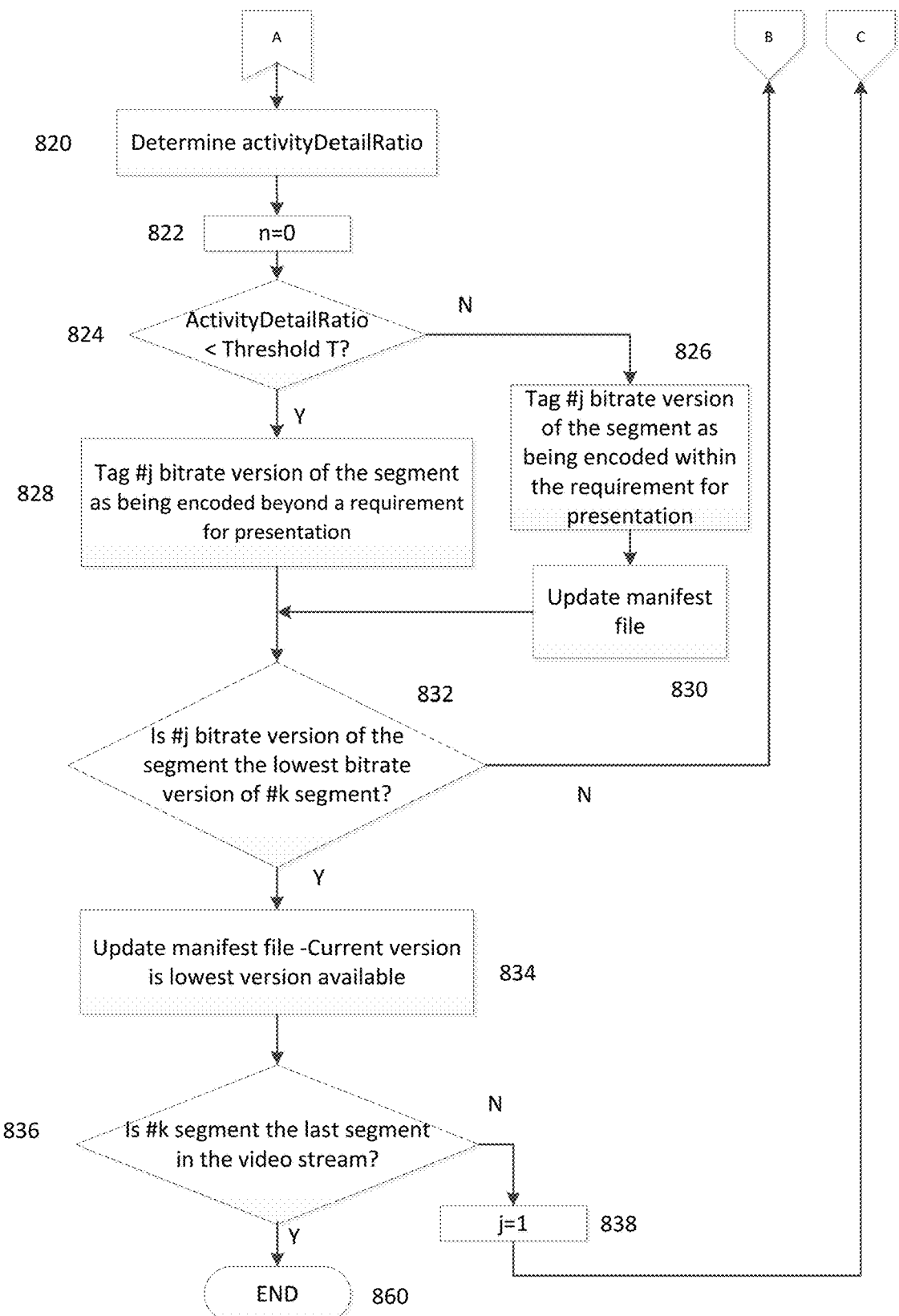

FIGS. 8A and 8B constitute an example flow diagram of determining quality of a video stream according to one or more illustrative aspects of the disclosure.

Determining quality of a video segment of a video stream comprises, based on video content of the video segment, identifying which quality/bitrate version(s) has been encoded beyond a requirement for presentation (a lower quality version of the segment has been deemed acceptable for presentation) and which quality/bitrate version(s) has been encoded within the requirement. The above identifying process may comprise determining quality of each video frame included in the bitrate version of the video segment. Details will be described below in reference to steps illustrated in FIGS. 8A and 8B.

At step 800, the system is initialized. At this step, parameters may be initialized before a video program is accessed and analyzed. The initialization includes, but is not limited to, i=1, j=1, k=1, and n=0. Parameter k is an integer and is an index (e.g., the segment identification as shown in FIG. 4) of video segments included in the video program; parameter j is an integer and is an index of bitrate versions (e.g., 1 for the high quality version as shown in FIGS. 4, 5 and 7, 2 for the intermediate quality version, and 3 for the low quality version) of the #k video segment in the video program; and parameter i is an integer and is an index of the frames included in the #j bitrate version of the #k video segment in the video program. Count n is an integer and increments by 1 once a frame of the #j bitrate version of the #k video segment is determined to be a HighDetail_ActivityFrame (which will be described later). The determination of HighDetail_ActivityFrame is the basis of determining whether this bitrate version of the segment is encoded beyond a requirement for presentation (a lower quality version of the segment has been deemed acceptable for presentation) or is encoded within the requirement for presentation.

In order to determine the bitrate version(s) encoded within the requirement for presentation for each video segment, the system performs the following steps (step 802-step 856) in a looping fashion until all the segments are analyzed. Details of the repeated analyzing process will be described below. By performing these steps, the system may analyze the various encoded versions of the various segments of a piece of content (e.g., a movie), and identify segments that have been encoded beyond a requirement for presentation (a lower quality version of the segment has been deemed acceptable for presentation) and can be re-encoded at a lower quality without an unacceptable loss in quality. As will be explained, when a segment encoded beyond a requirement for presentation has been identified, the corresponding manifest file for that version may point to the file having the lower quality version.

At step 802, the system may begin to process each segment of a video stream in the looping fashion. The system may access #k segment of a video stream that is stored in a server, for example, the content server 106. The system may start the analysis with #1 (the first) segment of the video stream. Once the system completes analysis of #1 segment, the system may continue to process #2 segment by incrementing parameter k by 1, and so on.

At step 804, the system may access #j bitrate version of the #k video segment of the video stream. In the example as shown in FIGS. 8A and 8B, the system may process the plurality of bitrate versions of a video segment in sequence one at a time. For example, the system may process the highest bitrate version in the first place, and process the second highest bitrate version at the second place, and so on. In the example as shown in FIGS. 8A and 8B, #1 bitrate version of a video segment is the highest bitrate version of the video segment, #2 bitrate version of the video segment is the second highest bitrate version of the video segment, and so on. In the example as shown in FIGS. 8A and 8B, the system starts the analysis with the highest bitrate version of a segment (#1 bitrate version of #k segment), and continues the analysis with the second highest bitrate version (#2 bitrate version of #k segment), the third highest bitrate version, and so on.

At step 806, the system may perform decoding of the bitstream of the #j bitrate version of the #k video segment of the video stream. One of ordinary skill in the art should appreciate that the decoding may be realized by entropy decode or other suitable technologies known in the art.

At steps 808-814, the system may analyze the detail/activity level of each frame of the #j bitrate version of the #k video segment.

At step 808, the system may determine the frame type of the #i frame of the decoded #j bitrate version of the #k video segment. As discussed previously, the frame type may be one of I-frame, P-frame, or B-frame. Still as discussed previously, among the three types of frames, the I-frame is the least compressible and does not require other video frames to decode; the P-frame is more compressible than an I-frame and requires data from previous frames to decompress; and the B-frame is the most compressible frame and requires both the previous and forward frames to decode.

At step 810, the system may determine the quality of the #i frame, e.g., whether the #i frame is a HighDetail_ActivityFrame based on the frame type of #i frame. A HighDetail_ActivityFrame is a frame that includes video content with details and/or activities meeting a certain criterion (which will be discussed below) and the certain criterion varies based on the frame type (I-frame, P-frame, or B-frame). The procedure of step 810 varies based on the frame type of the #i frame, and examples of step 810 will be described in details in FIGS. 9A-9C (which will be described later). If the system determines the #i frame is not a HighDetail_ActivityFrame, the process proceeds to step 814. If the system determines that the #i frame is a HighDetail_ActivityFrame, the process proceeds to step 812.

At step 812, the count n increments by 1, such that the system increase the number of determined HighDetail_ActivityFrames included in the #j bitrate version of the #k segment by 1. By doing so, the system may count the number of HighDetail_ActivityFrames included in the #j bitrate version of the #k segment.

At step 814, the system may determine that whether the #i frame is the last frame in the sequence in the #j bitrate version of the #k segment. If the system determines that the #i frame is not the last frame, the process proceeds to step 816. If the system determines that the #i frame is the last frame in the sequence, the process proceeds to step 818.

At step 816, the system increases parameter i by 1 and the process returns to step 808, such that the system will analyze the next frame (the #(i+1) frame) in the sequence in the #j bitrate version of the #k segment. The analysis process of the #(i+1) frame is the same as the analysis process of the #i frame as discussed above at steps 810-814.

At step 818, the system resets parameter i to be equal to 1, so that the reset parameter i may be used for the next bitrate version (#(j+1) bitrate version) of the #k segment. By doing so, the system may start the quality analysis with the first frame of #(j+1) bitrate version of the #k segment in the next loop.

Turning now to FIG. 8B, the system proceeds to step 820.

At step 820, the system may determine an activityDetailRatio which represents the ratio of the total number n of HighDetail_ActivityFrames to a total number N of frames in the #j bitrate version of the #k segment. The value of activityDetailRatio may be equal to n/N. The determination of the total number N of the frames is not shown in the figures; however, one of ordinary skill in the art should appreciate that the total number N may either be calculated during the analyzing process of the #j bitrate version by using another counter independent from counter n, or be predetermined prior to the analyzing process and be embedded as metadata with the video stream.

At step 822, the system resets the counter n to be equal to 0, so that the reset counter n may be used for the next bitrate version (#(j+1) bitrate version) of the #k segment.

Generally, higher quality/bitrate versions of encoding are used depending on the underlying video. For example, a video with more pixels (e.g., high-definition v. standard definition) or more small visual details may need higher quality/bitrate encoding than video that has fewer pixels or details. Video with a lot of activities may need higher quality/bitrate encoding than video with relatively little motion, since many video encoding techniques are differentially-encoded (e.g., the MPEG-2 example discussed above). A video segment that has many different colors may need a higher quality/bitrate encoding than a video segment with fewer colors. Various encoding techniques may benefit from various differences in the underlying video segment, and as described herein, a manifest file for playback of a particular encoding version of a piece of content may actually, for some segments, contain pointers to lower quality versions of the same segment, if that segment is deemed to not require the particular higher quality version.

At step 824, the system may determine that whether the activityDetailRatio is less than a predetermined threshold T, e.g., 0.3. In some examples, the value of the threshold T may be independent of different bitrate versions. If the system determines that the activityDetailRatio is less than the threshold T, the process proceeds to step 828 so that the system may tag the #j bitrate version of the #k segment as being encoded beyond a requirement for presentation (a lower quality is acceptable for presenting a predetermined video quality). If the system determines that the activityDetailRatio is greater than or equal to the threshold T, the process proceeds to step 826 so that the system may tag the #j bitrate version of the #k segment as a version encoded within the requirement for presentation.

At step 826, if the system determines that the activityDetailRatio is greater than or equal to the threshold T, the system may tag the #j bitrate version of the #k segment as a version encoded within a requirement for a satisfactory quality presentation to the user. At step 830, the system may update the manifest file of the video stream to include information representing that, among the plurality of bitrate versions, the #j bitrate version is a version encoded within a requirement for the satisfactory quality presentation. The version encoded within the requirement for presentation is not necessarily the highest bitrate version that the system can provide to the user device. As such, when the user device makes the downloading determination for a video segment, based on the information included in the manifest file, the user device will not choose a version encoded beyond a requirement for presentation (a lower quality version of the segment has been deemed acceptable for presentation), but will choose a version encoded within the requirement for presentation. As a result, the user device may download suitable bitrate version for each segment so that network bandwidth wastage may be reduced while the users viewing experience is not deteriorated.

After step 830 is completed, the process proceeds to step 832 (at which the system determines whether the #j bitrate version is the lowest bitrate version of #k segment); and when the system determines that the #j bitrate version is not the lowest bitrate version of #k segment, the process returns to step 804 in order to analyze the next bitrate (the #(j+1) bitrate) of #k segment.

At step 828, if the system determines that the activityDetailRatio is less than the predetermined threshold T, the #j bitrate version of the #k segment is tagged as a quality/ bitrate version encoded beyond a requirement for presentation (a lower quality has been deemed acceptable for presenting a predetermined video quality).

At step 832, the system may determine whether the #j bitrate version of the #k segment is the lowest bitrate version of the #k segment. If the #j bitrate version of the #k segment is the lowest available bitrate version of the #k segment, the process proceeds to step 834 to tag the #j bitrate version as a version encoded beyond a requirement for presentation and the lowest available bitrate version. If the #j bitrate version of the #k segment is not the lowest available bitrate version of the #k segment, the process proceeds to step 846 (at which the system increments j by 1) and then returns to step 804 such that the system will analyze the #(j+1) bitrate version of the #k segment and determine whether the #(j+1) bitrate version is required for a satisfactory quality presentation.

At step 834, the system may update the manifest file to reflect that the #j bitrate version is encoded beyond a requirement for presentation but is the lowest available bitrate version. As such, when the user device makes the downloading determination for a video segment, the user device will choose, based on the manifest file, to download this lowest available bitrate version even though it is still encoded beyond a requirement for presentation.

The updating of the manifest file can be done in a variety of ways, depending on the underlying encoding technique. For example, if MPEG-DASH is used, the tagging (described above at steps 826, 828, 830, 832, and 834) for a Representation (e.g., a bitrate version), among multiple Representations (e.g., multiple bitrate versions), may be represented by qualityEnhanced signaling, and the qualityEnhanced signaling may be implemented by, for example, adding a qualityEnhanced attribute to at least one Representation of the multiple Presentations. In some examples, the qualityEnhanced attribute may be an additional attribute of a Representation, and the qualityEnhanced attribute may be a true-false parameter. For example, when a bitrate version is encoded beyond a requirement for presentation (a lower quality version of the segment has been deemed acceptable for presentation), the qualityEnhanced attribute may be set to false; and when a bitrate version is properly encoded, the qualityEnhanced attribute may be set to true. When there is a change to the qualityEnhanced attribute for a Representation, the manifest file of the video stream may be updated and available to the user devices. When the qualityEnhanced attribute is signaled in the manifest file, the user device may be notified which bitrate version of each video segment is encoded within a requirement for presentation (a lower quality has deemed not acceptable for presenting a predetermined video quality) and thus can make downloading decision based on the qualityEnhanced attribute embedded in the manifest file.

In some examples, determination of whether a Representation (among multiple Representations) of a segment is encoded beyond a requirement for presentation (a lower quality has been deemed acceptable for presenting a predetermined video quality) or is encoded within the requirement for presentation may be also based on the resolution of the user devices. For example, the video provider may provide the following Representations for a segment of a video:

Representation #1: 3.45 Mbps (encoding bitrate); 1280×720 (resolution of the user display); 30 fps (frame rate: frames per second);
Representation #2: 2.2 Mbps; 960×540; 30 fps;
Representation #3: 1.4 Mbps; 960×540; 30 fps;
Representation #4: 900 Kbps; 512×288; 30 fps;
Representation #5: 600 Kbps; 512×288; 30 fps;
Representation #6: 400 Kbps; 340×192; 30 fps; and
Representation #7: 200 Kbps; 340×192; 30 fps.

In one case, by performing steps 804-834 as discussed above, the system may analyze every one of Representations #1-#7 and determine whether a Representation is encoded beyond a requirement for presentation (a lower quality has been deemed acceptable for presenting a predetermined video quality) or is encoded within the requirement for presentation. The system may determine that Representation #1 is properly encoded for the satisfactory quality presentation, Representation #2 is encoded beyond a requirement for presentation (a lower quality has been deemed acceptable for presenting a predetermined video quality), Representations #3, #5, #7 are properly encoded for the satisfactory quality presentation, and Representations #4 and #6 are encoded beyond a requirement for presentation (a lower quality has been deemed acceptable for presenting a predetermined video quality). In another case where the user device is a smart phone, based on the resolution of the smart phone, the system may determine that the user device may only select between Representation #4-#7 for display; and the system may further determine that the properly encoded bitrate for the smart phone is Representation #5.

In some cases, the manifest file may include data indicating whether a lower quality version has been deemed acceptable and whether this segment truly benefits from, or needs, this level of encoding. For example, the manifest file may add a true-false tag for each quality/bitrate version of each segment to show whether a lower quality version has been deemed acceptable.

In the implementation of MPEG-DASH, the system may remove the attribute/indication of a Representation from the manifest file if the system determines that this Representation is encoded beyond a requirement for presentation (a lower quality has been deemed acceptable for presenting a predetermined video quality) and replaces the attribute/indication of the Representation (encoded beyond the requirement) by an attribute/indication of a Representation (encoded within the requirement), and the system may update the manifest file available to the user devices. By doing so, the system may provide only the Representation that is properly encoded for the satisfactory quality presentation is available to the user device to download. In some cases, the system may update the database, that stores the multiple Representations of the video, by deleting this Representation (encoded beyond the requirement) from the database. By doing so, the system may advantageously reduce the required storage space of the database that stores the multiple Representations of the video.

In other examples, the system may indicate to the user device, in user data fields in the MPEG-2 Transport packet headers or ISOBMFF m4s file box structures, whether a Representation is required for a satisfactory quality presentation.

At step 836, when the analysis of the #j bitrate version is completed, the system may determine whether the #k segment is the last segment in the sequence in the video stream. If the system determines that the #k segment is not the last segment of the video stream, the process proceeds to step 838 (at which the system resets j to be equal to 1) and then to step 856 (at which the system increments k by 1), and eventually returns to step 802 in order to analyze the next segment (the #(k+1) segment). If the system determines that the #k segment is the last segment of the video stream, the system determines that each segment of the entire video stream has been analyzed and the process ends at step 860.

By this process, the system provides the user devices with data indicating quality of each video segment of a video stream and helps the users to wisely choose a suitable bitrate version for each segment, among multiple available bitrate versions.

In some cases, the system may send the user device a complete manifest file of the video program (e.g., a manifest file including information of all segments of the video program), and the user device may ask the user to view the complete manifest file via a user interface, and the user device may allow the user to choose the bitrate version of each video segment of the video program based on the manifest file and via the user interface.

In some cases, the system may provide the user device with an optional and pre-formulated bitrate version playlist of the video segments according to different service levels (e.g., as shown in the manifest file of FIG. 7), with which the user device determines that choosing the pre-formulated bitrate version list can increase the downloading speed without disadvantageously impacting the users viewing experience. The pre-formulated bitrate version list may include the properly encoded bitrate version for each segment determined by the process illustrated in FIGS. 8A and 8B.

The discussion above processes the complete manifest files (e.g., in case of on-demand video program), but in some cases (e.g., in the case of live video programs), the manifest files might not be fully ready at the time of processing. In those situations, the system may update the incomplete manifest file in real time and allow the user device to download a properly encoded version for a next video segment.

In some cases, during the initial setup or maintenance of the user device, the user device may ask the user, via a user interface (e.g., a graphic user interface (GUI)), if the user allows the user device to choose a resolution (which is not necessarily the highest bitrate version that the system can provide to the user device) for some or all of the segments of a video program, when the user device determines that choosing this resolution can increase the downloading speed by reducing network bandwidth wastage without disadvantageously impacting the users viewing experience.

The steps in the example flow diagram illustrated in FIGS. 8A and 8B need not all be performed in the order specified and some steps may be changed in order, or performed simultaneously. For example, step 832 may be performed after step 802 and before step 804. In this case, before the j loop starts, the system may determine whether the #j bitrate is the lowest bitrate version of #k segment. If the system determines that the #j bitrate is the lowest bitrate version, the process may skip all the intermediate steps and jump straightly to step 834.

As described previously, step 810 in FIG. 8A varies based on the type of the #i frame, and details will be described in FIGS. 9A-9C.

Figure 9A:
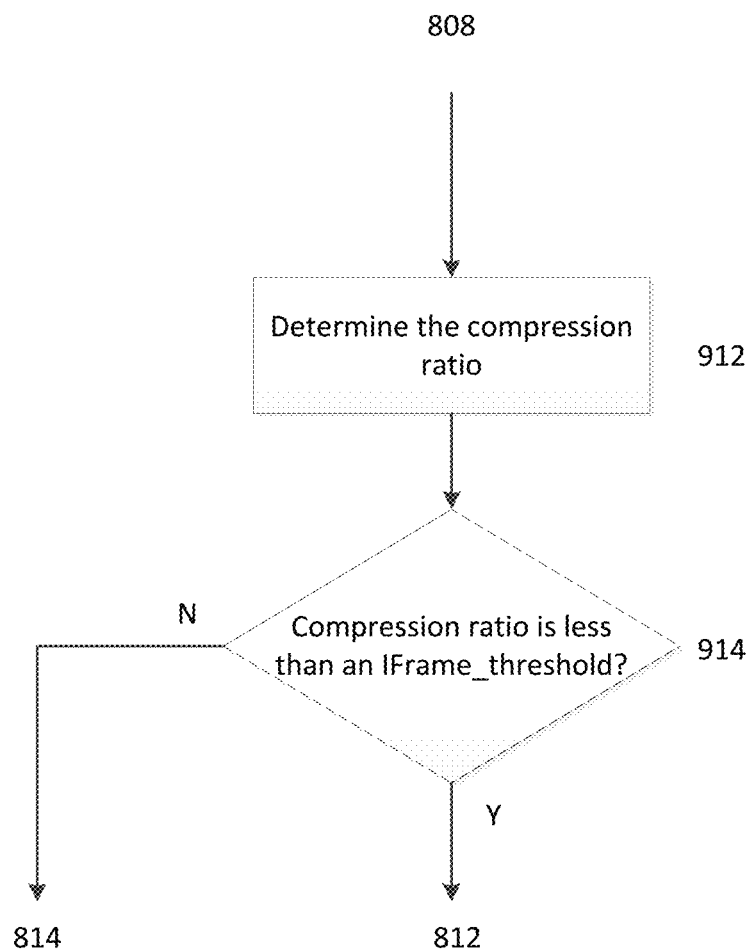
FIG. 9A is an example flow diagram of step 810 of FIG. 8A when the analyzed frame is an I-frame according to one or more illustrative aspects of the disclosure.

FIG. 9A is an example flow diagram of step 810 of FIG. 8A when the analyzed frame is an I-frame according to one or more illustrative aspects of the disclosure.

When the system determines that the #i frame is an I-frame at step 808 of FIG. 8A, the process proceeds to step 912.

At step 912, the system may determine the number of bits required to represent this frame. The determining the number of bits required to represent this frame may comprise determining the compression ratio achieved for this frame. The compression ratio is a factor by which an image file has been reduced after compression. For example, when a 500 MB size video frame is compressed to 100 MB, the compression ratio is a factor of 5. The higher the compression ratio is, the greater the video frame is compressed.

At step 914, the system may compare the compression ratio with a predetermined threshold IFrame_threshold, e.g., 38. The threshold IFrame_threshold may be determined based on observations from various encoded video streams. When the compression ratio is less than the threshold IFrame_threshold, the system marks this frame as a HighDetail_ActivityFrame. The process then proceeds to step 812 in FIG. 8A. When the compression ratio is greater than or equal to the threshold IFrame_threshold, processes goes straightly to step 814 in FIG. 8A.

Figure 9B:
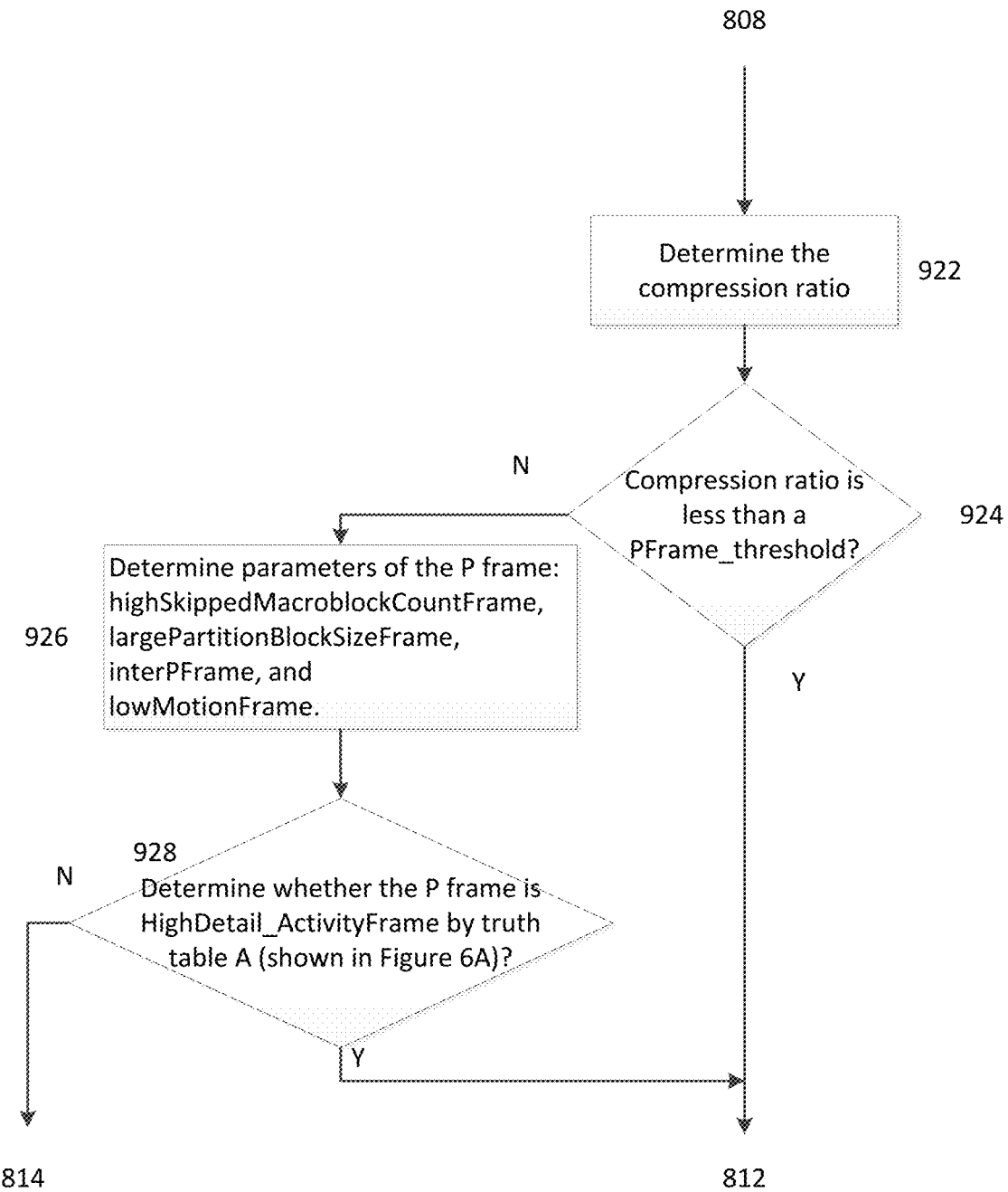
FIG. 9B is an example flow diagram of step 810 of FIG. 8A when the analyzed frame is a P-frame according to one or more illustrative aspects of the disclosure.

FIG. 9B is an example flow diagram of step 810 of FIG. 8A when the analyzed frame is a P-frame according to one or more illustrative aspects of the disclosure. FIG. 10A is an example true table used at step 928 of FIG. 9B according to one or more illustrative aspects of the disclosure.

When the system determines that the #i frame is a P-frame at step 808, the process proceeds to step 922.

At step 922, the system may determine the number of bits required to represent the residual image (e.g., motion vectors). The determining the number of bits required to represent the residual image may comprise determining the compression ratio achieved for this frame.

At step 924, the system may compare the compression ratio with a predetermined threshold PFrame_threshold, e.g., 60. The threshold PFrame_threshold may be determined based on observations from various encoded video streams. When the compression ratio is less than the threshold PFrame_threshold, the system marks this frame as a HighDetail_ActivityFrame. The process then proceeds to step 812 in FIG. 4A. When the compression ratio is greater than or equal to the threshold PFrame_threshold, processes goes to step 926.

At step 926, the system may determine the following true-false parameters:

a. highSkippedMacroblockCountFrame. The highSkippedMacroblockCountFrame is determined based on a number of skipped macroblocks. A skipped macroblock is a macroblock (e.g., including 16×16 pixels) without residual image or motion vectors being provided to the decoder. If the number of skipped macroblocks is greater than a threshold skippedMacroblockCountThresholdPPicture, e.g., 70% of the total macroblocks, the system may mark this frame as a highSkippedMacroblockCountFrame. For example, if the video segment is largely static (e.g., perhaps an evening news program in which a person is sitting at a desk, and for the 2-second duration of a video segment, the only movement happens to be the person's lips), then in one frame of the video segment, there may be many macroblocks in which no movement occurs from a prior frame. The number of skipped macroblocks of this one frame is greater than the threshold skippedMacroblockCountThresholdPPicture, and this one frame is determined by the system as a highSkippedMacroblockCountFrame.

b. largePartitionBlockSizeFrame. The largePartitionBlockSizeFrame is determined based on partitions block sizes. If the number of 16×16 macroblocks is greater than a threshold blockSize_thresholdPPicture, e.g. 60% of the total macroblocks in the frame, the system may mark this frame as a largePartitionBlockSizeFrame. In another implementation, for High Efficiency Video Coding (HEVC) (also known as H.265), if the number of 64×64 macroblocks is greater than a threshold blockSize_thresholdPPicture, the system may mark this frame as a largePartitionBlockSize-Frame. For example, in a frame, regions having more details may include more smaller size macroblocks, and regions having less details may include more larger size macroblocks.

c. interPFrame. The interPFrame is determined based on a number of inter coded blocks in the frame. If the number of inter coded blocks is greater than interBlockCountThreshold_PPicture, e.g., 30% of the total macroblocks in the frame, the system may mark this frame as an interPFrame. If the number of inter coded blocks is less than interBlockCountThreshold_PPicture, the system may determine that the frame includes a scene change and is unable to predict from previous frames, and the system may consider to allocate more bits to this frame.

d. lowMotionFrame. The lowMotionFrame is determined based on motion vectors for each partition in the frame. The system may determine the 90% trimmed standard deviation of the horizontal and vertical components of the motion vectors. If the 90% trimmed standard deviation is below the horizontalMVOffset_PPicture and verticalMVOffset_PPicture, the system may mark this frame as a lowMotionFrame. For example, horizontalMVOffset_PPicture may be 2 and verticalMVOffset_PPicture may be 2. Large variation or standard deviation standard deviation may indicate that the frame has a great amount of activity, and thus the system may consider to allocate more bits to the frame.

At step 928, based on highSkippedMacroblockCountFrame, largePartitionBlockSizeFrame, interPFrame, and lowMotionFrame determined above at step 526, the system may determine whether the P-frame is a HighDetail_ActivityFrame by using the example truth table A as shown in FIG. 10A.

In FIG. 10A, the truth table A shows how to determine whether a P-frame is a HighDetail_ActivityFrame by using parameters highSkippedMacroblockCountFrame, largePartitionBlockSizeFrame, interPFrame, and lowMotionFrame determined at step 926 as shown on FIG. 9B. For all possible true/false combinations of highSkippedMacroblockCountFrame, largePartitionBlockSizeFrame, interPFrame, and lowMotionFrame, a final value is shown in the most right column of Table A.

For example, as shown in the second row of truth table A, when the system, at step 926, determines that the P-frame is not a highSkippedMacroblockCountFrame, not a largePartitionBlockSizeFrame, not an interPFrame, not a lowMotionFrame, the system determines that the P-frame is a HighDetail_ActivityFrame.

As another example, as shown in the third row of truth table A, when the system, at step 926, determines that the P-frame is a highSkippedMacroblockCountFrame, regardless whether the P-frame is a largePartitionBlockSizeFrame, an interPFrame, and/or a lowMotionFrame, the system determines that the P-frame is not a HighDetail_ActivityFrame. In this case, at step 926, once the system determines that the P-frame is a highSkippedMacroblockCountFrame, the system may skip the determinations for parameters largePartitionBlockSizeFrame, interPFrame, and a lowMotionFrame.

Figure 9C:
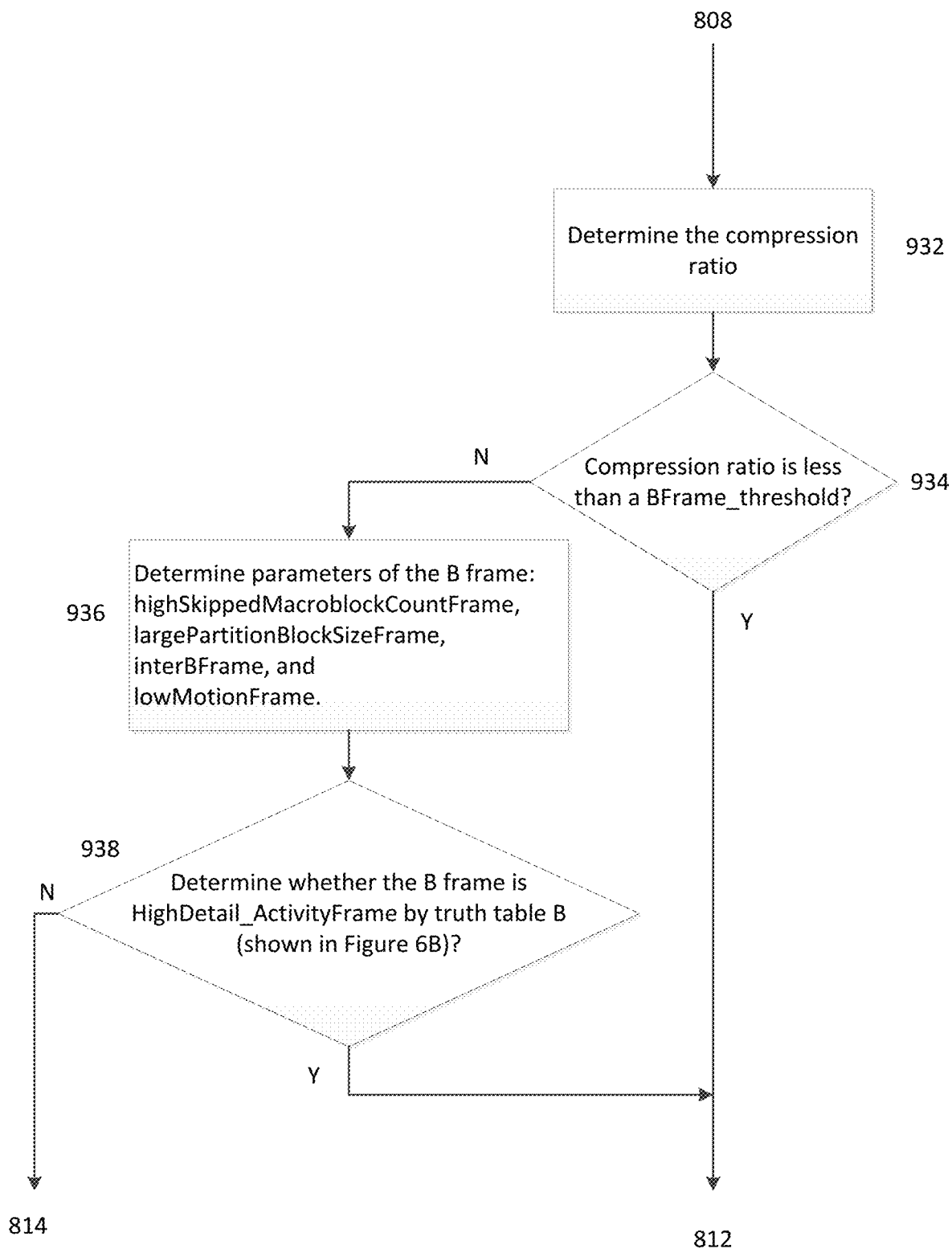
FIG. 9C is an example flow diagram of step 810 of FIG. 8A when the analyzed frame is a B-frame according to one or more illustrative aspects of the disclosure.

FIG. 9C is an example flow diagram of step 810 of FIG. 8A when the analyzed frame is a B-frame according to one or more illustrative aspects of the disclosure. FIG. 10B is an example true table used at step 938 of FIG. 9C according to one or more illustrative aspects of the disclosure.

When the system determines that the #i frame is a B-frame at step 808, the process proceeds to step 932.

At step 932, the system may determine the number of bits required to represent the residual image (e.g., motion vectors). The determining the number of bits required to represent the residual image may comprise determining the compression ratio achieved for this frame.

At step 934, the system may compare the compression ratio with a predetermined threshold BFrame_threshold, e.g., 400. The threshold BFrame_threshold may be determined based on observations from various encoded video streams. When the compression ratio is less than the threshold BFrame_threshold, the system marks this frame as a HighDetail_ActivityFrame. The process then proceeds to step 812 in FIG. 8A. When the compression ratio is greater than or equal to the threshold BFrame_threshold, processes goes to step 936.

At step 936, the system determines the following true-false parameters:

a. highSkippedMacroblockCountFrame. The highSkippedMacroblockCountFrame is determined based on a number of skipped macroblocks. If the number of skipped macroblock is greater than a threshold skippedMacroblockCountThresholdBPicture, e.g., 98% of the total macroblocks in the frame, the system may mark this frame as a highSkippedMacroblockCountFrame.

b. largePartitionBlockSizeFrame. The largePartitionBlockSizeFrame is determined based on partitions block sizes. If the number of 16×16 macroblocks is greater than a threshold blockSize_thresholdBPicture, e.g., 60% of the total macroblocks in the frame, the system may mark this frame as a largePartitionBlockSizeFrame. In another implementation, for High Efficiency Video Coding (HEVC), if the number of 64×64 macroblocks is greater than a threshold blockSize_thresholdBPicture, the system may mark this frame as a largePartitionBlockSizeFrame.

c. interBFrame. The interBFrame is determined based on a number of inter coded blocks in the frame. If the number of inter coded blocks is greater than interBlockCountThreshold_BPicture, e.g., 8% of the total macroblocks in the frame, the system may mark this frame as an interBFrame.

d. lowMotionFrame. The lowMotionFrame is determined based on motion vectors for each partition in the frame. The system may determine the 90% trimmed standard deviation of the horizontal and vertical components of the motion vectors. If the 90% trimmed standard deviation is below the horizontalMVOffset_BPicture and verticalMVOffset_BPicture, the system may mark this frame as a lowMotionFrame. For example, horizontalMVOffset_PPicture may be 2 and verticalMVOffset_PPicture may be 2.

The above fourth true-false parameters are similar to the fourth true-false parameters for P-frame discussed previously, except that the above fourth true-false parameters are for B-frame.

At step 938, based on parameters highSkippedMacroblockCountFrame, largePartitionBlockSizeFrame, interBFrame, and lowMotionFrame determined above at step 936, the system may determine whether the B-frame is a HighDetail_ActivityFrame by using the example truth table B as shown in FIG. 10B.

The threshold values discussed above, that are utilized for determining whether an I-frame, P-frame, or B-frame is a HighDetail_ActivityFrame, may be set also based on the encoding method (e.g., MPEG-2, AVC, or HEVC), the resolution of the display device, and/or frame rates.

As illustrated on FIG. 10B, the truth table B shows how to determine whether a B-frame is a HighDetail_Activity-Frame by using parameters highSkippedMacroblock-CountFrame, largePartitionBlockSizeFrame, interBFrame, and lowMotionFrame determined at step 936 as shown on FIG. 9C.

The truth table B as shown on FIG. 10B is similar to the truth table A as shown on FIG. 10A, except that parameter interBFrame of truth table B replaces parameter interPframe of the truth table A. Description of FIG. 10B will be omitted.

Figure 11:
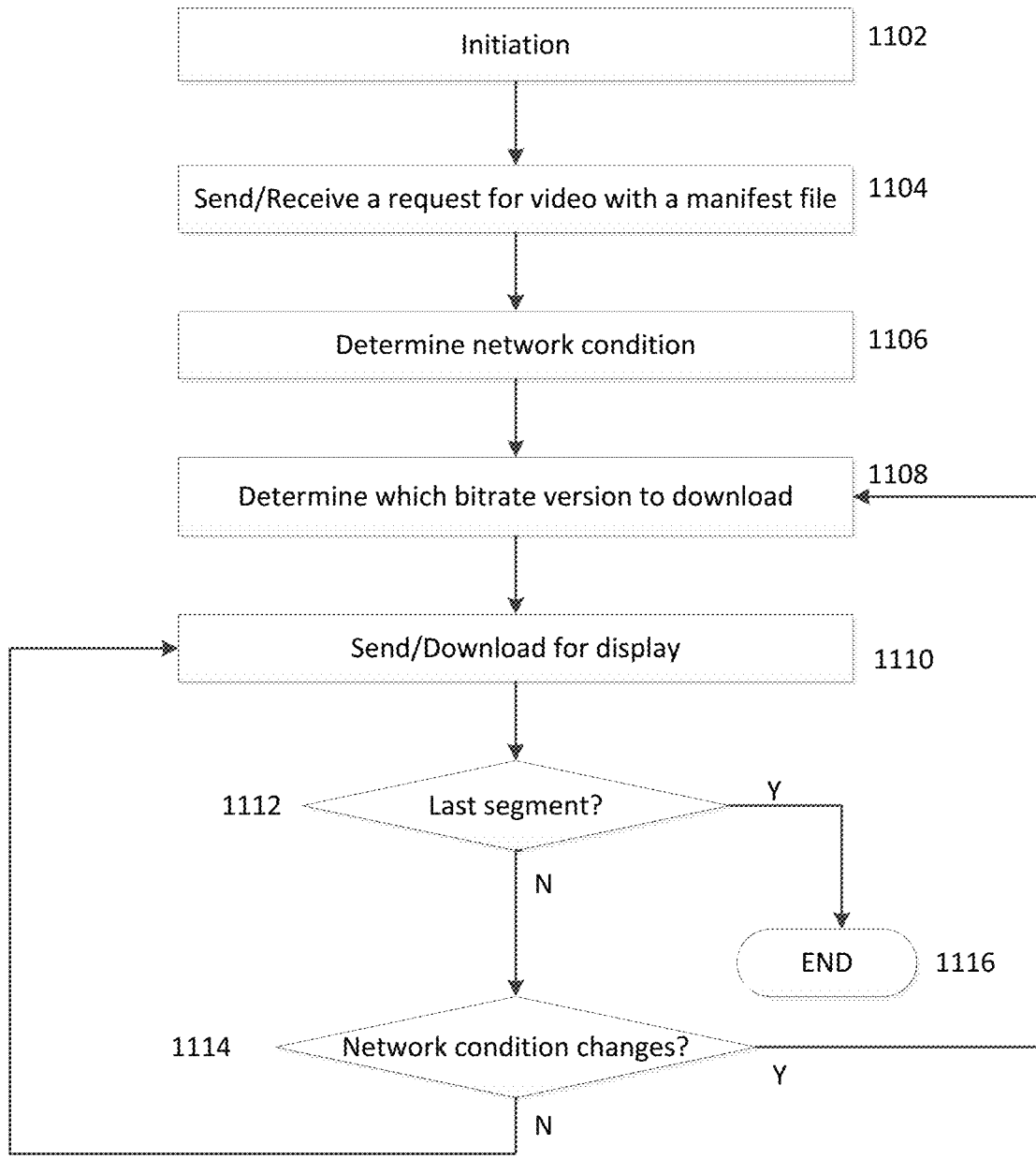
FIG. 11 shows an example flow diagram for making a downloading decision for a video program based on complexity/quality analysis of the video according to one or more illustrative aspects of the disclosure.

FIG. 11 shows an example flow diagram for making a downloading decision for a video program based on complexity/quality analysis of the video according to one or more illustrative aspects of the disclosure.

At step 1102, the system is initialized. For example, when a user turns on a user device, the user device may detect device parameters, e.g., system capacity and display resolution of the user device. In some examples, the user device may locally store these parameters and use these parameters to determine which quality/bitrate version should be downloaded. In some examples, the user device may communicate these device parameters to the system (e.g., elements as shown in FIG. 3 other than the user devices 312) so that the system to made the downloading decision.

At step 1104, the user device may send a request for a video and the system may receive the request. The requested video may be accompanied by a manifest file that includes information of the requested video. As discussed above, the manifest file may be a manifest file (e.g., as shown in FIG. 5) that indicates multiple bitrate versions of each segment and complexity for each segment. In some examples, the manifest file may be a manifest file (e.g., as shown in FIG. 7) that indicates pre-formulated playlists according different service levels. In some examples, the manifest file may be a manifest file that includes a true-false tag for each quality/bitrate version of each segment to show whether a lower quality version of this segment has been deemed acceptable.

In some cases, the user device may determine which quality/bitrate version should be requested for download based on the complexity rate and the network condition. In such cases, at step 1104, the user device may receive the manifest file. At step 1106, the user device may determine a network condition, for example, the network condition between the origin server 306 and the user device 312 as shown in FIG. 3. At step 1108, if the user device determines that the network between the origin server 306 and the user device 312 is not experiencing any congestion, the user device may select the highest available bitrate version for the service level associated with the user device. For example, when the network is not experiencing any congestion, the user device associated with a high service level may select a high quality/bitrate version even when a lower quality is acceptable for presenting a predetermined video quality. On the other hand, when the network is experiencing congestion, the user device associated with a high service level may select to download a lower quality/bitrate version of a segment based on a low complexity rating (e.g., a low complexity rating correlated to a low quality/bitrate version as shown in FIG. 5), while the lower quality/bitrate is acceptable for presenting a predetermined video quality. In some examples, when the network is experiencing congestion, the user device associated with a high service level may select a lower quality/bitrate version based on a true-false tag included in the manifest file showing that a high quality/bitrate version is encoded beyond a requirement while a lower quality is acceptable for presenting a predetermined video quality. In some cases, the user device may further depend on the device parameters (e.g., display resolution of the user device as discussed above) detected at step 1102 to make the downloading decision.

In some cases, the system, rather than the user device, may determine, for the user device, which quality/bitrate version should be downloaded based on the complexity rate and the network condition. In such cases, at step 1104, the system may retrieve the manifest file, for example, from the database 310 as shown in FIG. 3. At step 1106, the system may determine the network condition between the origin server 306 and the database 310 where the segment is to be retrieved from. When the network is not experiencing any congestion, the system may select a high quality/bitrate version for the user device associated with a high service level even when a lower quality is acceptable for presenting a predetermined video quality. On the other hand, when the network is experiencing congestion, the system may select a lower quality/bitrate version of a segment based on a low complexity rating (e.g., a low complexity rating correlated to a lower quality/bitrate version as shown in FIG. 5) for the user device associated with a high service level, while the lower quality/bitrate is acceptable for presenting a predetermined video quality. In some cases, when the network is experiencing congestion, the system may select a lower quality/bitrate version for the user device based on a true-false tag included in the manifest file showing that a high quality/bitrate version is encoded beyond a requirement while a lower quality is acceptable for presenting a predetermined video quality. In some cases, the system may further depend on the device parameters (e.g., display resolution of the user device as discussed above) transmitted from the user device at step 1102 to make the downloading decision for the user device.

The network condition may occur at any other locations in the system.

At step 1110, based on the determination at step 1108, the user device may download a bitrate version of a segment for display, or the system may send the user device a bitrate version of a segment to download.

At step 1112, the user device or the system may determine whether the last segment has been downloaded. For example, when the user has clicked the "stop" bottom, it is determined that the last segment has been downloaded. As another example, when the user device or the system determines that the last segment of the entire video has been downloaded in reference to video information included in the manifest file (e.g., the segment ID in the manifest file), the user device or the system may determine the last segment has been downloaded. If the user device or the system determines that the last segment has been downloaded, the process ends at step 1116. If the user device or the system determines that the last segment has not been downloaded, the process proceeds to step 1114.

At step 1114, the user device or the system may periodically determine whether a network condition has changed. If the user device or the system determines that a network condition has changed, the process returns to step 1108. At step 1108, the user device or the system may re-determine which quality/bitrate version should be downloaded based on the manifest file and the changed network. For example, when a bad network condition becomes a good network condition, the user device or the system may determine to switch from lower bitrate versions to the highest available bitrate versions of the segments (which have low complexity rates), even when a lower quality is acceptable for presenting a predetermined video quality. As another example, when a good network condition becomes a bad network condition, the user device or the system may determine to switch from the highest available bitrate versions to lower bitrate versions of segments (which have low complexity rates), when a lower quality is acceptable for presenting a predetermined video quality. If the user device or the system determines that a network condition has not changed, the process returns to step 1108. At step 1108, the user device or the system keeps to download segments based on the unchanged network condition and complexity rate of a segment. Determination of whether a network condition is good or bad may be based on a network speed, or any feasible network parameters.

In some examples, regardless the network condition, the user device or system may always select a lower quality/bitrate when the lower quality/bitrate is acceptable for presenting a predetermined video quality. For example, at step 1108, the user device or system may only rely on the pre-formulated playlists included in the manifest file (as shown in FIG. 7) to make the downloading decision. In such examples, step 1106 and step 1114 may be omitted.

Additional alterations, modifications, and improvements as are made obvious by this disclosure are intended to be part of this description though not expressly stated herein, and are intended to be within the spirit and scope of the disclosure. The descriptions above may be rearranged/divided/combined as desired, and one or more components or steps may be added or removed without departing from the spirit of the present disclosure. Accordingly, the foregoing description is by way of example only, and not limiting. This patent is limited only as defined in the following claims and equivalents thereto.

The invention claimed is:

1. A method comprising:
receiving, from a user device, a request to receive a version of a video stream at a requested quality level;
receiving information indicating complexity ratings of a plurality of segments of the video stream;
generating, based on the complexity ratings, a playlist comprising:
a sequence of the plurality of segments of the video stream,
for at least one first segment, of the plurality of segments, having a first complexity rating lower than a threshold value, a first indication that a first recommended quality level, lower than the requested quality level, should be used for requests associated with a first service level and for requests associated with a second service level, wherein the second service level is higher than the first service level; and
for at least one second segment, of the plurality of segments, having a second complexity rating higher than the threshold value:
a second indication that the first recommended quality level should be used for the requests associated with the first service level, and
a third indication that a second recommended quality level, which is higher in quality than the first recommended quality level, should be used for the requests associated with the second service level; and
based on the received request, sending the playlist to the user device.

2. The method of claim 1, further comprising:
selecting for the user device, based on the complexity ratings, one of a plurality of versions of the plurality of segments of the video stream.

3. The method of claim 1, wherein the playlist further comprises, for each segment of the plurality of segments, at least one of a uniform resource locator, an Internet address, or a file address.

4. The method of claim 1, wherein the threshold value comprises a first threshold value, wherein a second threshold value is higher than the first threshold value, and wherein the playlist further comprises:
for the at least one first segment, a fourth indication that the first recommended quality level should be used for requests associated with a third service level, wherein the third service level is higher than the second service level;
for the at least one second segment, a fifth indication that the second recommended quality level should be used for the requests associated with the third service level; and
for at least one third segment, of the plurality of segments, having a third complexity rating higher than the second threshold value:
a sixth indication that the first recommended quality level should be used for the requests associated with the first service level;
a seventh indication that the second recommended quality level should be used for the requests associated with the second service level; and
an eighth indication that a third recommended quality level, which is higher in quality than the second recommended quality level, should be used for the requests associated with the third service level.

5. The method of claim 1, wherein each complexity rating of the complexity ratings is based on content of a corresponding segment of the plurality of segments.

6. The method of claim 1, wherein the playlist further comprises a degree of correlation between the complexity ratings of the plurality of segments and a plurality of versions of the plurality of segments of the video stream.

7. A method comprising:
receiving, from a user device, a request to receive a requested-quality version of a video stream, wherein the video stream comprises a plurality of segments;
determining a quality of the requested-quality version and a complexity of a segment of the plurality of segments;
generating, based on the quality of the requested-quality version and the complexity of the segment, and further based on a service level associated with the user device, a first indication that a lower-quality version of the segment has been deemed acceptable for presentation, wherein the lower-quality version comprises an encoding bitrate lower than an encoding bitrate of the requested-quality version;
generating a manifest file comprising:
a first playlist for a first service level, the first playlist comprising a first sequence of access locations of first respective versions of the plurality of segments of the video stream;
a second playlist for a second service level different from the first service level, the second playlist comprising a second sequence of access locations of second respective versions of the plurality of segments of the video stream, wherein the second playlist is different from the first playlist, wherein the first respective versions and the second respective versions comprise the lower-quality version of the segment, wherein the first respective versions and the second respective versions comprise different versions of at least one other segment of the plurality of segments, and wherein a complexity of the at least one other segment is higher than the complexity of the segment; and a second indication of a degree of correlation between the complexity of the segment and the lower-quality version of the segment; and sending, to the user device, the manifest file.

8. The method of claim 7, wherein the first sequence of access locations and the second sequence of access locations comprise at least one of a uniform resource locator, an Internet address, or a file address.

9. The method of claim 7, further comprising:
sending, to the user device, the lower-quality version of the segment.

10. The method of claim 7, wherein the determining the complexity of the segment comprises: determining a complexity of a frame of the segment.

11. The method of claim 7, wherein the determining the complexity of the segment comprises:
determining a frame type of a frame of the segment; and
determining, based on the frame type of the frame, whether the frame comprises details satisfying a criterion that is based on the frame type of the frame.

12. The method of claim 7, further comprising:
determining, based on motion in the segment, that the lower-quality version has been deemed acceptable.

13. The method of claim 7, further comprising:
determining, based on a compression ratio of an independent frame in the segment, that the lower-quality version of the segment is acceptable for presentation.

14. The method of claim 7, wherein the determining the complexity of the segment comprises:
based on a determination that a frame of the segment is a dependent frame, determining, further based on a compression ratio of the frame, whether the frame comprises video content with details satisfying a criterion.

15. A method comprising:
sending, by a user device, a request for a version of a video stream at a requested quality level;
receiving a playlist comprising:
a sequence of a plurality of segments of the video stream,
for one or more first segments, of the plurality of segments, that have a first complexity rating below a threshold value, a first indication of a recommended quality level that is lower than the requested quality level and is same for a first service level and a second service level, wherein the first service level is higher than the second service level, and
for one or more second segments, of the plurality of segments, that have a second complexity rating above the threshold value,
a second indication of the requested quality level for the first service level, and
a third indication of the recommended quality level for the second service level;
requesting to receive, based on the playlist, the one or more first segments of the plurality of segments at the recommended quality level that is lower than the requested quality level; and
receiving the one or more first segments of the plurality of segments at the recommended quality level that is lower than the requested quality level.

16. The method of claim 15, wherein the requesting to receive the one or more first segments of the plurality of segments at the recommended quality level that is lower than the requested quality level is based on a network condition.

17. The method of claim 15, wherein the playlist further comprises at least one of a uniform resource locator, an Internet address, or a file address.

18. The method of claim 15, wherein the requesting to receive the one or more first segments at the recommended quality level is based on a determination that a network associated with the video stream is experiencing congestion.

19. A method comprising:
receiving, by a computing device and from a user device, a request for a video stream;
retrieving a manifest file of the video stream, wherein the manifest file comprises:
complexity ratings of a plurality of segments of the video stream,
a first service level playlist comprising a first segment of the plurality of segments and a second segment of the plurality of segments, wherein the first segment has a first complexity rating that is below a threshold, and wherein the second segment has a second complexity rating that is above the threshold, and
a second service level playlist comprising the first segment and the second segment, wherein the first service level playlist and the second service level playlist indicate:
a same recommended quality level for the first segment, and
different recommended quality levels for the second segment;
sending, based on the manifest file, at least one segment.

20. The method of claim 19, wherein the manifest file further comprises a third service level playlist comprising the first segment and the second segment, wherein the third service level playlist indicates, for the second segment, a recommended quality level that is same as the second service level playlist.

21. The method of claim 19, wherein the first service level playlist and the second service level playlist correspond to different network conditions.

22. The method of claim 19, wherein the first service level playlist further comprises a degree of correlation, for the first segment,
between the first complexity rating and the same recommended quality level.

* * * * *